United States Patent [19]
Kawabe et al.

[11] Patent Number: 5,601,244
[45] Date of Patent: Feb. 11, 1997

[54] SPINNING REEL WITH MOVABLE LINE GUIDE ALONG REEL AXIS

[75] Inventors: Yuzo Kawabe, Izumi; Kenichi Sugawara, Sakai; Yasuhiro Hitomi, Hashimoto, all of Japan

[73] Assignee: Shimano Inc., Osaka, Japan

[21] Appl. No.: 285,943

[22] Filed: Aug. 4, 1994

[30]   Foreign Application Priority Data

| Aug. 4, 1993 | [JP] | Japan | 5-193237 |
| Sep. 9, 1993 | [JP] | Japan | 5-224093 |
| Sep. 14, 1993 | [JP] | Japan | 5-228435 |

[51] Int. Cl.$^6$ ............................................. A01K 89/01
[52] U.S. Cl. ................................. 242/232; 242/241
[58] Field of Search ........................... 242/241, 231, 242/242, 232

[56]       References Cited

U.S. PATENT DOCUMENTS

| 1,150,575 | 8/1915 | Boldgett | 242/241 |
| 1,755,195 | 4/1930 | Stanley | 242/241 |
| 2,711,045 | 6/1955 | Novack | 242/241 |
| 2,732,147 | 1/1956 | Rotter | 242/241 |
| 2,798,679 | 7/1957 | Grosh | 242/241 |

FOREIGN PATENT DOCUMENTS 3-99959  10/1991  Japan.

*Primary Examiner*—Katherine Matecki
*Attorney, Agent, or Firm*— Knobbe, Martens, Olson & Bear LLP

[57]       ABSTRACT

A spinning reel includes a reel body, a handle, a spool supported in a forward position of the reel body through a spool shaft, and a rotor rotatable about an axis by drive transmitted from the handle to wind a fishing line on the spool. The rotor includes a first arm and a second arm extending forwardly from peripheries of the rotor, a line guide portion mounted on the first arm to be movable substantially in fore and aft directions of the reel body, a bail extending from the vicinity of the line guide portion, and a transmission mechanism for moving the line guide portion. The transmission mechanism is disposed radially outwardly of the spool and extending in the fore and aft direction.

22 Claims, 22 Drawing Sheets

5,601,244

SPINNING REEL WITH MOVABLE LINE GUIDE ALONG REEL AXIS

BACKGROUND OF THE INVENTION

1. Field of the Invention

The present invention relates to a spinning reel having a spool mounted forwardly of a reel body, a rotor rotatably supported by the reel body, and a line guide portion formed on an arm disposed peripherally of the rotor for guiding a fishing line with rotation of the rotor to wind the fishing line on the spool. More particularly, the invention relates to a spinning reel in which the line guide portion is reciprocable back and forth relative to the reel body and spool, instead of the spool reciprocating back and forth, to level the layer of the fishing line wound on the spool in the fore and aft direction.

2. Description of the Related Art

A spinning reel having the above construction is disclosed in Japanese Utility Model Publication Kokai No. 3-99959, for example. This prior construction includes a transmission mechanism having a screw shaft extending parallel to a spool shaft, and a shuttle member engaged with a helical groove defined on the screw shaft. The transmission mechanism is disposed in a region outside the reel body but capable of interfering with the spool in an axial direction. The transmission mechanism takes out reciprocating drive and transmits the drive to the line guide portion.

The above prior construction has an advantage of allowing the reel body to be compact since the transmission mechanism is disposed outside the reel body for driving the line guide portion back and forth. However, the rotor as a whole cannot be formed compact. This is because the transmission mechanism is disposed in a region forwardly of the reel body and rearwardly of the spool, requiring the reel body and spool to be spaced apart. In addition, the rotor must define a space for accommodating movement of a coupling member which transmits drive from the transmission mechanism to the line guide portion. Improvement is desired in this respect.

SUMMARY OF THE INVENTION

The object of the present invention is to provide a spinning reel which is formed compact as a whole, with the rotor formed compact without impairing compactness of the reel body.

The above object is fulfilled, according to the present invention, by a spinning reel comprising a transmission system disposed radially outwardly of a spool and extending in a fore and aft direction to move a line guide portion, and an intermediate transmission system extending radially of an axis of the spool to transmit drive from a handle to the first-mentioned transmission system.

In the above construction, the transmission mechanism for reciprocating the line guide portion is disposed radially outwardly of the spool. Thus, a space for accommodating the transmission mechanism need not be provided between the spool and reel body.

This spinning reel is formed compact as a whole, with the rotor as well as the reel body formed compact.

In a preferred embodiment of the invention, the transmission mechanism for reciprocating the line guide portion is mounted in an arm disposed radially outwardly of the spool and supporting the line guide portion. Thus, the transmission mechanism drives the fine guide portion from a position very close thereto. That is, a coupling member between the transmission mechanism and line guide portion has little chance of being subjected to adverse influences to cause its elastic deformation, for example. Thus, besides facilitating compactness of the reel body, the invention allows the fishing line to be wound accurately in predetermined positions on the spool at all times, with the line guide portion remaining steady relative to the spool even when the fishing line is wound to apply a strong tension to the line guide portion.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Embodiments of the present invention will be described hereinafter with reference to the drawings.

First Embodiment

Figure 1:
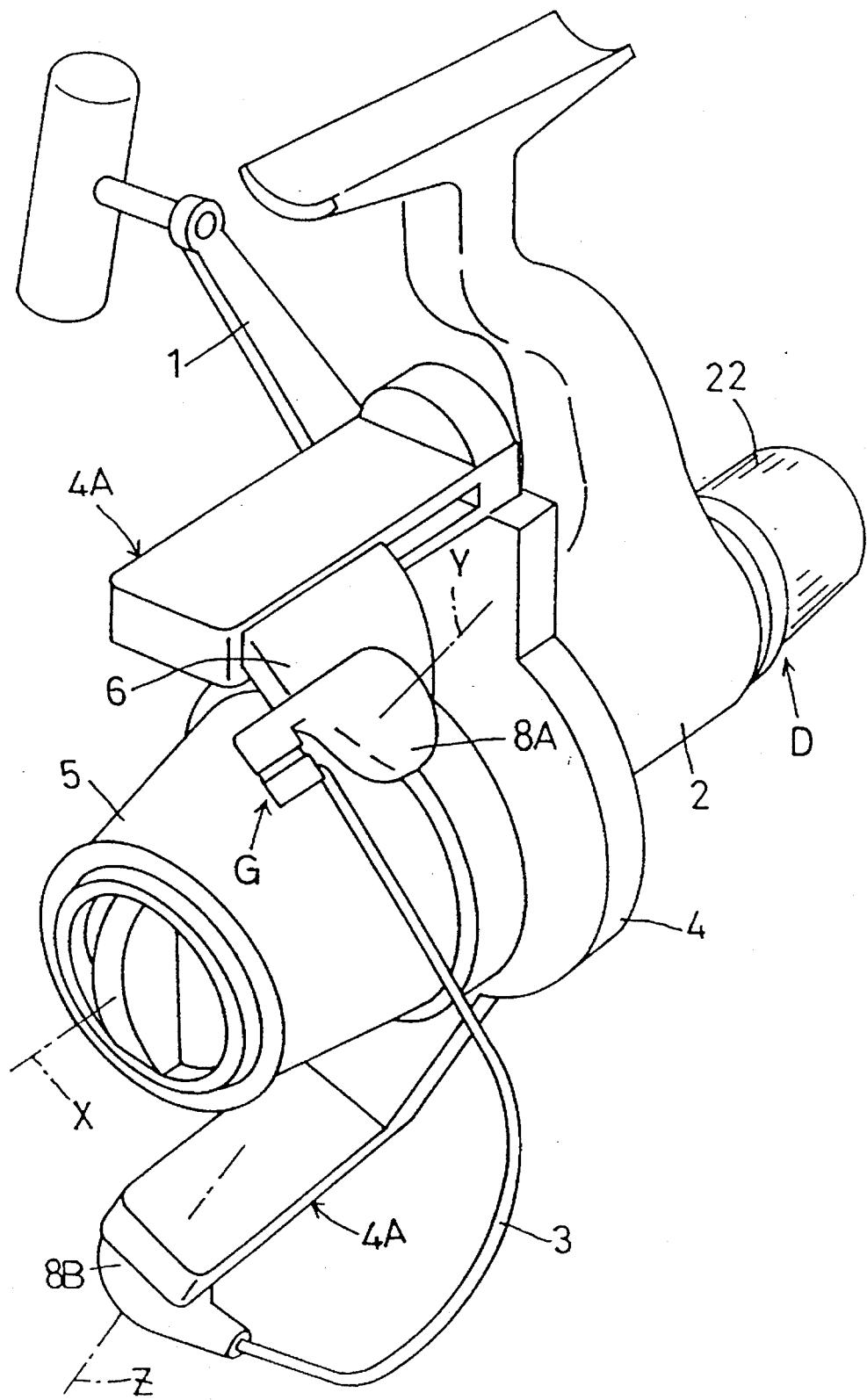
FIG. 1 is a perspective view of a spinning reel in a first embodiment of the present invention.
Figure 2:
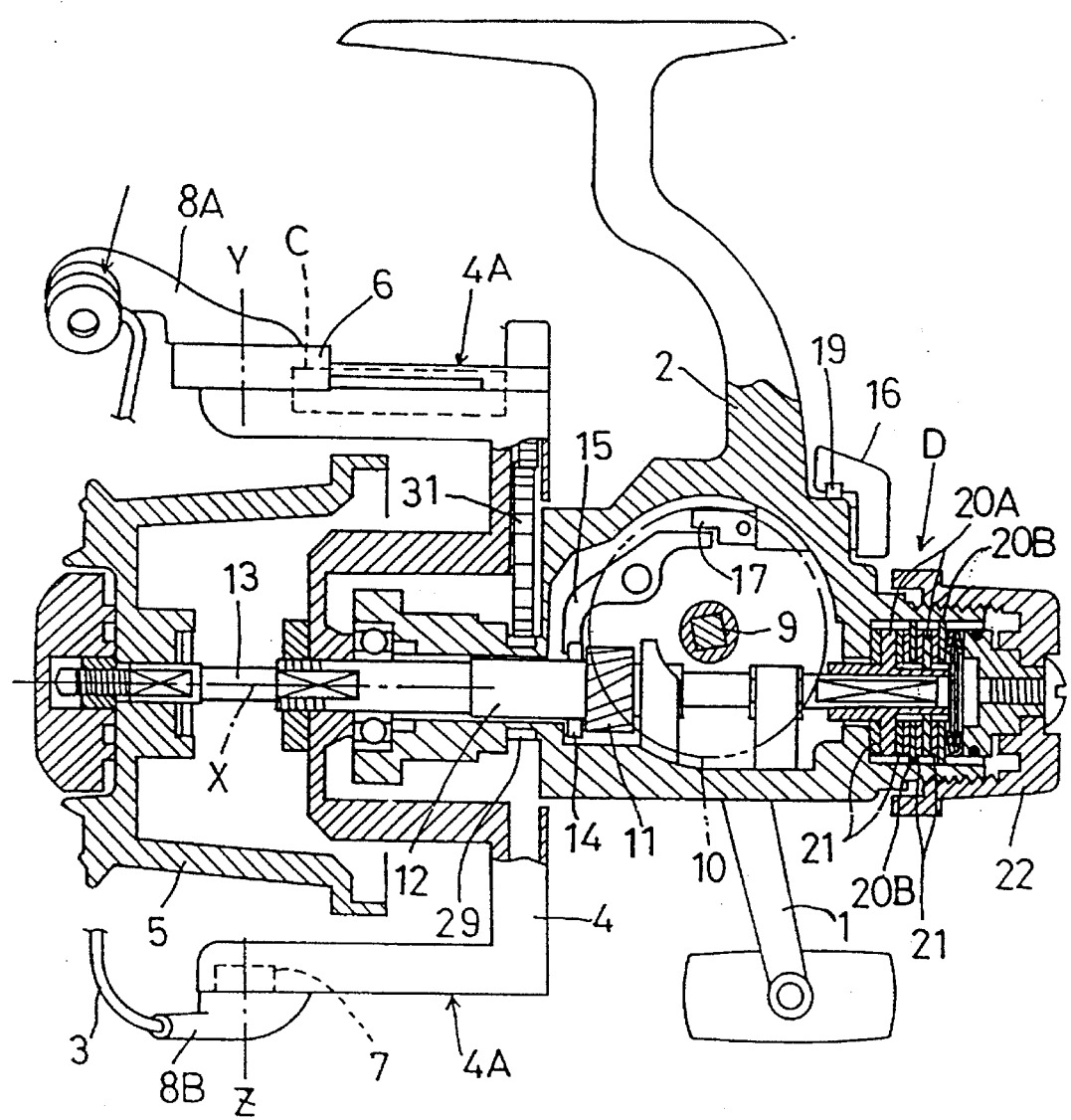
FIG. 2 is a side view in vertical section of the spinning reel shown in FIG. 1.
Figure 3:
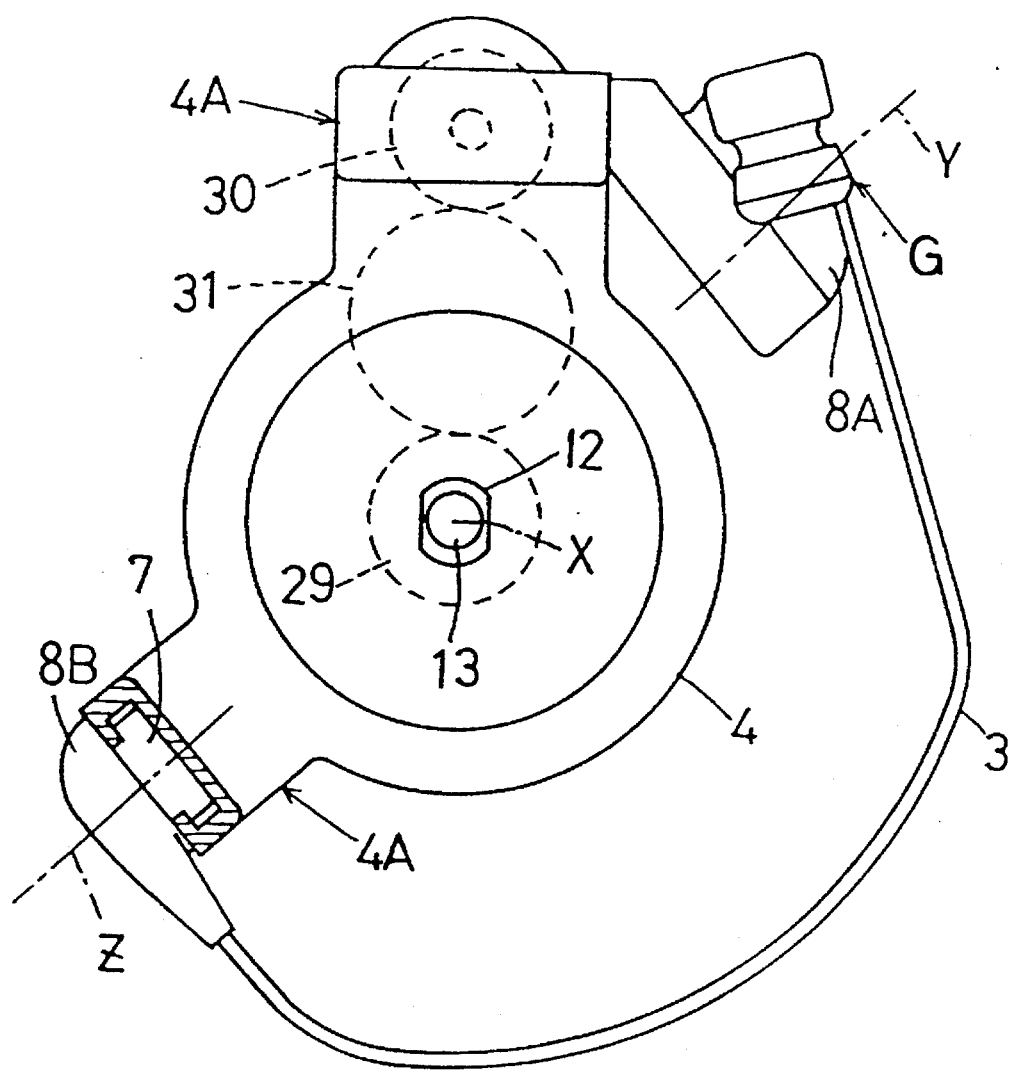
FIG. 3 is a front view of a rotor of the spinning reel shown in FIG. 1, showing a track of an intermediate transmission device.

As shown in FIGS. 1 through 3, a spinning reel includes a handle 1 attached to a reel body 2, a rotor 4 carrying a bail 3 and mounted on a forward portion of the reel body 2, and a spool 5 connected to the forward portion of the reel body 2.

The rotor 4 is supported by the reel body 2 to be rotatable relative thereto about an axis X. The rotor 4 includes a pair of arms 4A formed integral therewith. One of the arms 4A has a slide member 6 slidable back and forth relative thereto. The other arm 4A has a driven member 7 which is pivotally movable relative thereto. The slide member 6 and driven member 7 support an arm member 8A and a support arm 8B to be pivotable about axes Y and Z, respectively. The arm member 8A includes a line guide portion G, and the bail 3 is secured to and extends between the line guide portion G and support arm 8B.

The reel body 2 has a line winding drive system mounted therein for rotating the rotor 4. The drive system transmits drive from a drive gear 10 rotatable by the handle 1, to the rotor 4 through a pinion gear 11 and a sleeve shaft 12 integral with the pinion gear 11. The spool 5 is connected to a spool shaft 13 fitted in the sleeve shaft 12. A ratchet wheel 14 is formed integral with the sleeve shaft 12 for stopping rotation of the spool shaft 13 in a line unwinding direction, with a stopper 15 pivotably mounted in the reel body 2 for engaging teeth of the wheel 14. A drag mechanism D is disposed rearwardly of the reel body 2 for applying drag to the spool shaft 13.

Figure 4:
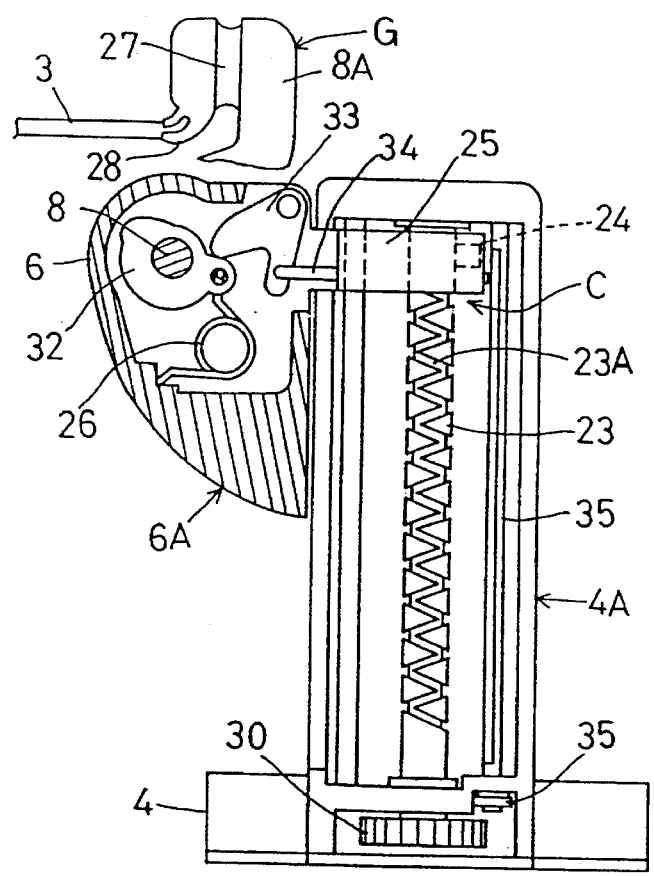
FIG. 4 is a plan view in cross section of a reciprocating mechanism and adjacent components of the spinning reel shown in FIG. 1.
Figure 5:
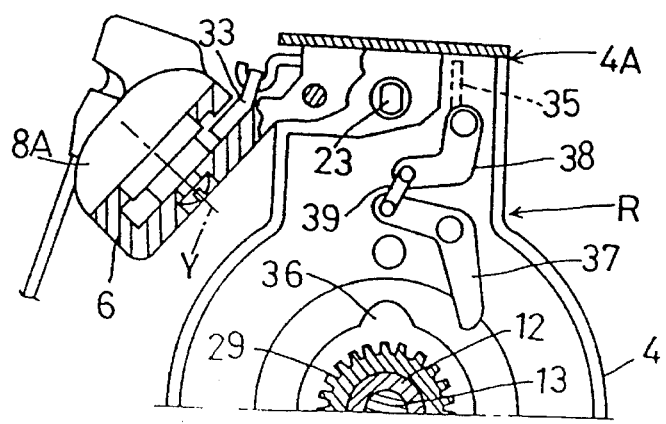
FIG. 5 is a rear view in vertical section of a bail return mechanism of the spinning reel shown in FIG. 1.

As shown in FIG. 2, the stopper 15 is switchable between an operative position and an inoperative position through contact with a cam 17 connected to a switch lever 16. The drag mechanism D includes a plurality of friction plates 20A mounted on the spool shaft 13 not to be rotatable relative thereto, another friction plates 20B mounted in the reel body 2 not to be rotatable relative thereto, intermediate friction plates 21 rotatable relative either to the spool shaft 13 or the reel body 2, and a dial 22 screw-fed to press these friction plates 20A and 20B against each other with the intermediate plates 21 in between. As shown in FIG. 4, the arm 4A having the slide member 6 contains a reciprocating mechanism C including a screw shaft 23 defining an endless helical groove 23A on a surface thereof, and a movable member 25 movable with an engaging piece 24 engaged with the helical groove 23A. The movable member 25 and slide member 6 are rigidly interconnected. The slide member 6 includes a line entanglement stopper 6A formed integral therewith and containing a toggle spring 26 for selectively retaining the arm member 8A in a line winding position and a line releasing position.

The line entanglement stopper 6A is shaped to approach the arm 4A as it extends rearward, to facilitate forward release of the fishing line contacting the arm 4A. The line guide portion G includes a roller 27 rotatably supported by the arm member 8A, with a guide piece 28 formed integral with the arm member 8A and covering an end of the bail 3.

As shown in FIGS. 2 and 3, a sun gear 29 is fixed in a forward position of the reel body 2 to be coaxial with the axis X. The screw shaft 23 has a driven gear 30 provided at one end thereof. A planet gear 31 is disposed between the sun gear 29 and driven gear 30. These gears constitute a drive system for reducing and transmitting a torque of the rotor 4 in rotation to the screw shaft 23 to move the line guide portion G back and forth.

Figure 6:
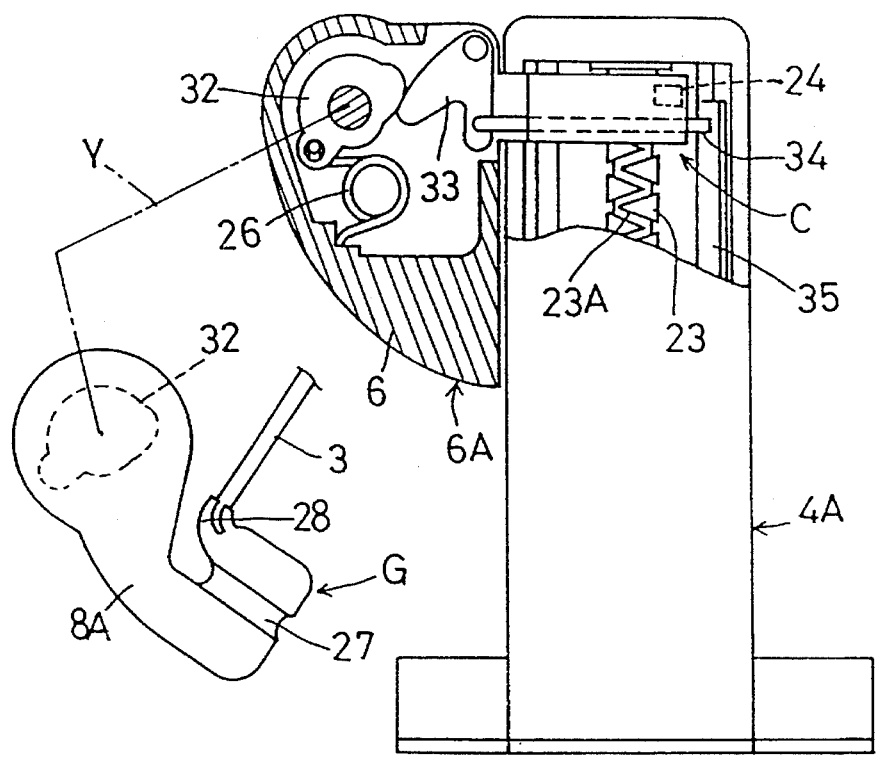
FIG. 6 is a plan view in cross section of the return mechanism in a bail opening position.
Figure 7:
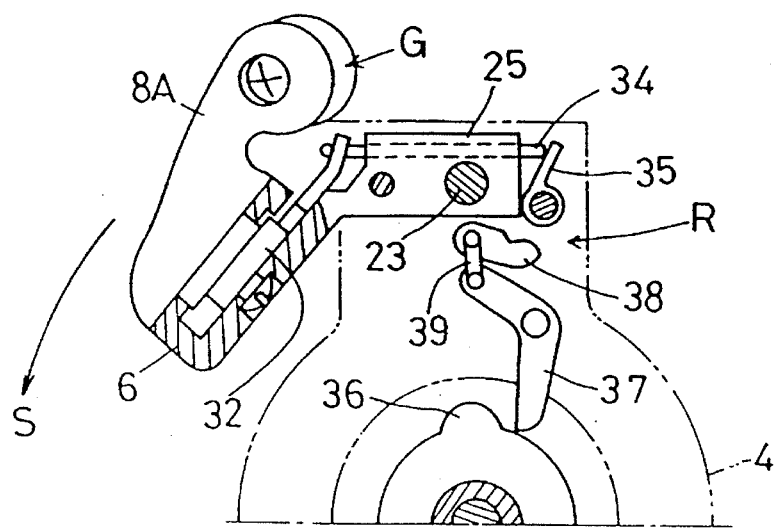
FIG. 7 is a rear view in vertical section of the return mechanism in the bail opening position.

As shown in FIGS. 4 through 7, the arm 4A having the line guide portion G includes a control piece 33 pivotable through contact with a cam element 32 formed integral with the arm cam 8A. The control piece 33 is interlocked to a rod 34 extending through the movable member 25. The arm 4A contains a return member 35 disposed adjacent an end of the rod 34 to be pivotable about an axis extending parallel to the axis X of the spool 5. Further, the reel body 2 has a cam member 36 formed in a forward position thereof for contacting and swinging a first swing piece 37. A second swing piece 38 is directly coupled to the return member 35. A link 39 interconnects the first swing piece 37 and second swing piece 38. These elements constitute a bail return mechanism R for automatically returning the bail 3 from a line releasing position to a line winding position in response to rotation of the rotor 4 in a line winding direction. When the bail 3 is in the line releasing position, as shown in FIGS. 6 and 7, the rod 34 is projected to pivot the return member 35 and place the first swing piece 37 in contact with the cam member 36. When, in this state, the rotor 4 is rotated in the line winding direction (as indicated by arrow S in FIG. 7), the cam member 36 applies a pressing force through the first swing piece 37, link 39 and second swing piece 38 to the return member 35. As a result, the return member 35 pivots to push back the rod 24, thereby causing the control piece 33 and cam element 32 to restore the arm member 8A and bail 3 in the line winding position. With the spinning reel having the above construction, when the handle 1 is operated after setting the bail 3 to the line winding position, the reciprocating mechanism C, in response to rotation of the rotor 4, drives the arm member cam 8A and line guide portion G back and forth to cause the fishing line to be wound in appropriate positions on the spool. At this time, the support arm 8B at the other side connected to the line guide portion G through the bail 3 also moves back and forth with the line guide portion G. At a bait casting time, the bail 3 is set to the line releasing position, and is retained in the line releasing position by the biasing force of toggle spring 26. When the handle 1 is operated in this state, the bail return mechanism R applies a restoring force to return the bail 3 to the line winding position. Then the arm member 8A is maintained in the line winding position by the biasing force of toggle spring 26.

Figure 8:
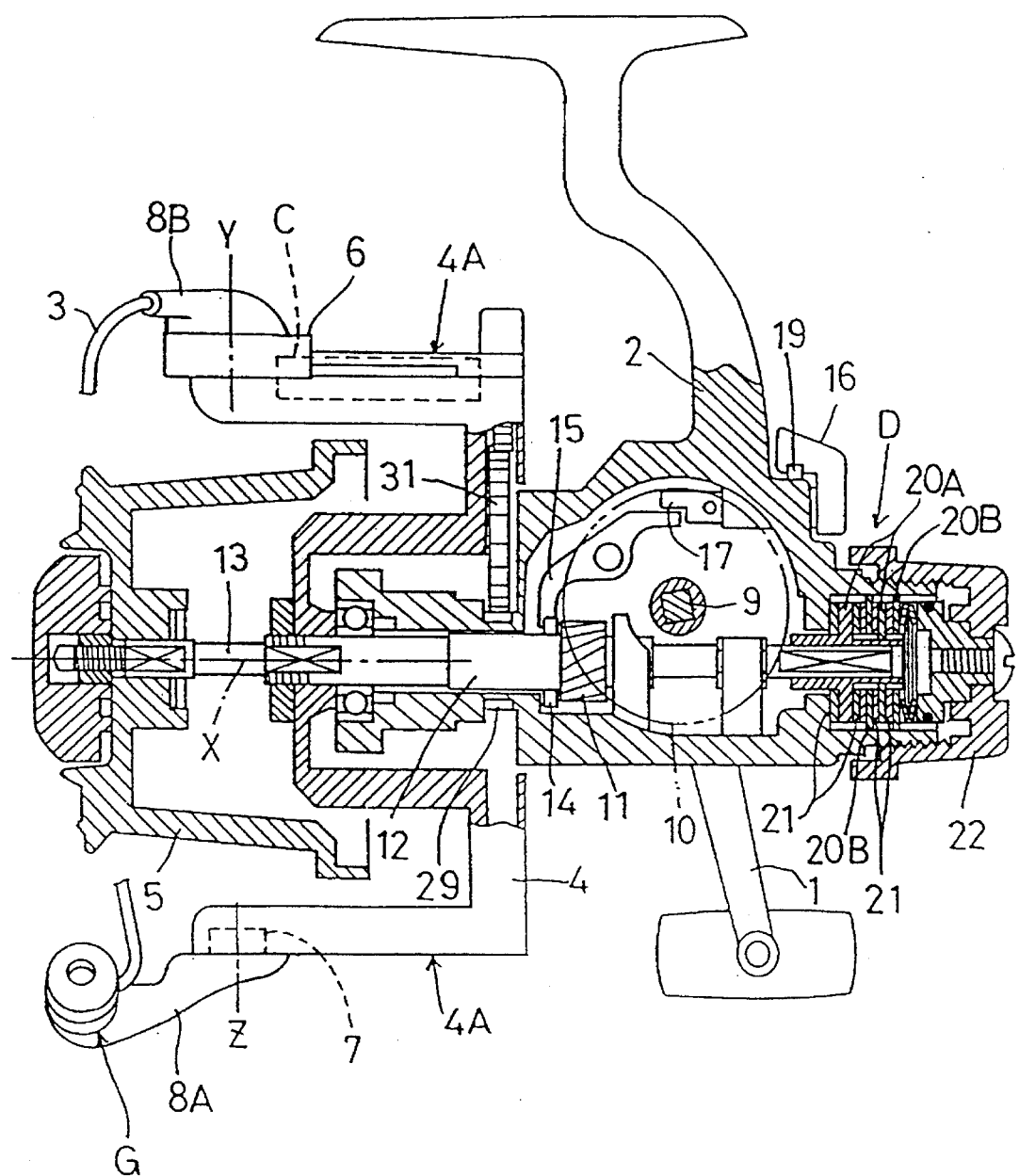
FIG. 8 is a view showing a different embodiment in which a line guide portion is supported by a driven member.

As shown in FIG. 8, the line guide portion G may be attached to the driven member 7 which is pivotally movable in the other arm 4A, instead of the arm 4A having the reciprocating mechanism C. In this case also, the line guide portion G performs the same function to allow the fishing line to be wound on the spool.

Figure 9:
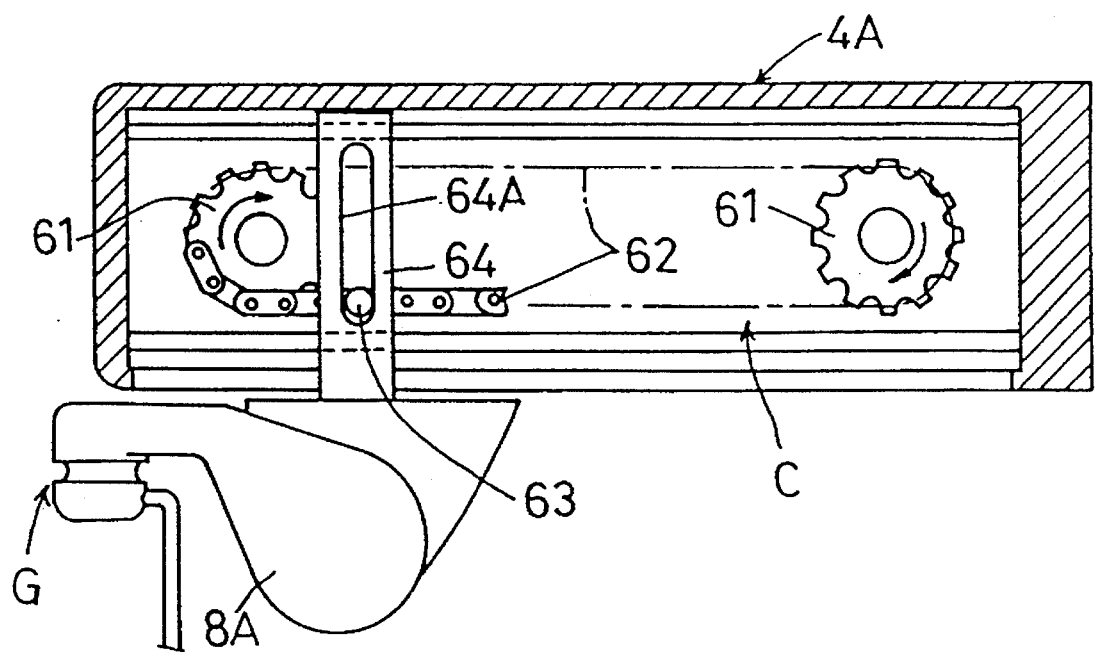
FIG. 9 is a view showing a modified reciprocating mechanism employing an endless chain.

As shown in FIG. 9, the reciprocating mechanism C may be formed of a pair of sprocket 61, an endless chain 62 wound around the sprockets 61, an engaging pin 63 attached to one of the link plates of the endless chain 62, and a slide member 64 defining a slot 64A for receiving the engaging pin 63. One of the sprockets 61 is driven to move the line guide portion G back and forth with the slide member 64.

Figure 10:
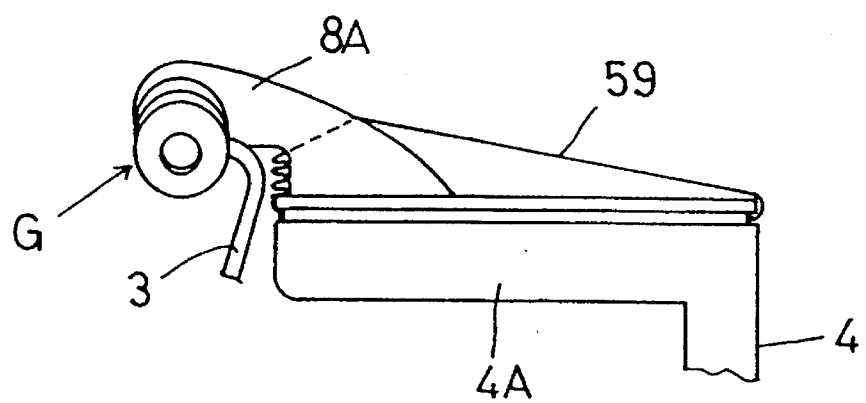
FIG. 10 is a side view of a dust-proof rubber cover provided for the line guide portion.
Figure 11:
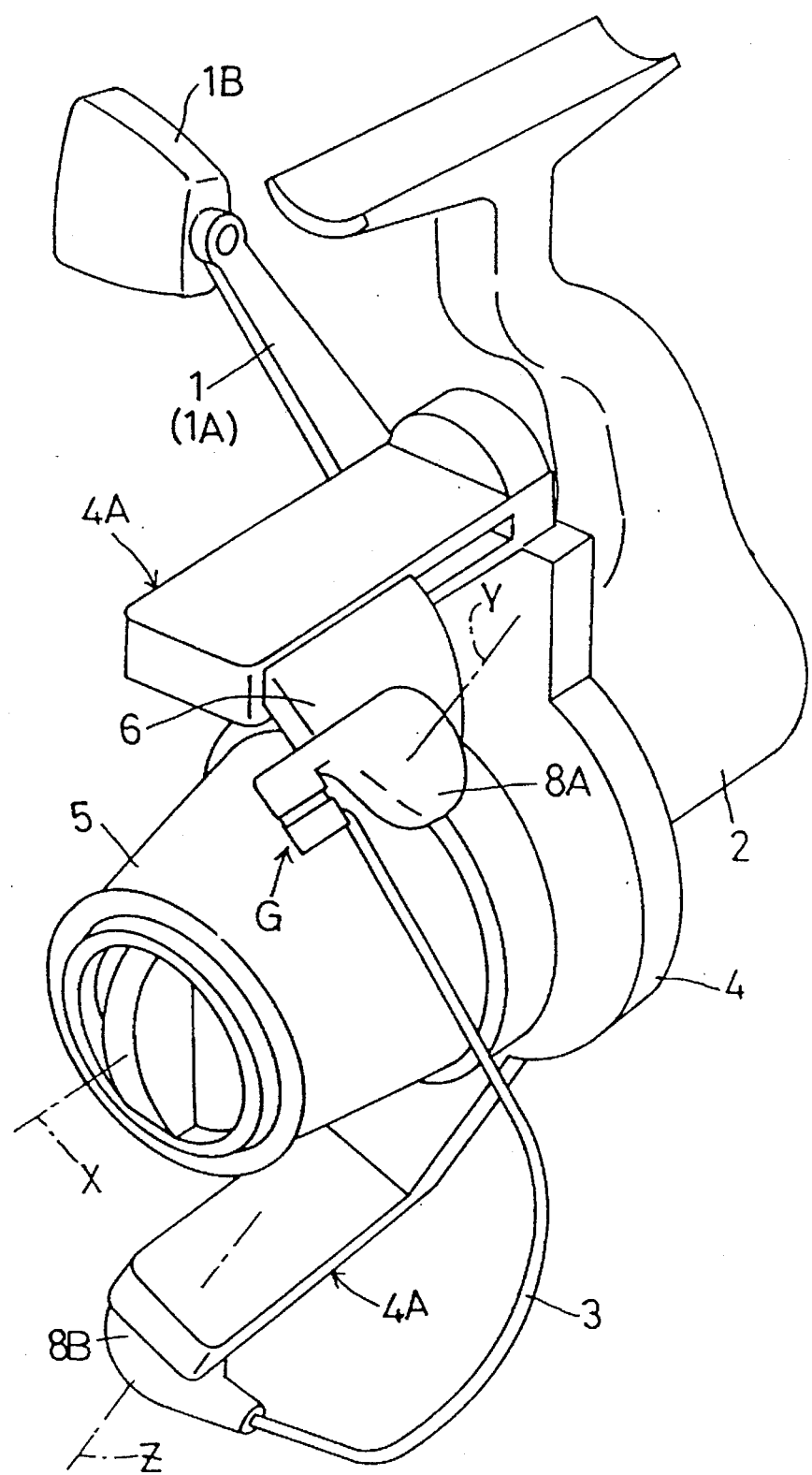
FIG. 11 is a perspective view of a spinning reel in a second embodiment of the invention.

As shown in FIG. 10, a soft rubber cover 59 may be formed between the arm cam 8A and arm 4A in a way to allow operation of the arm member 8A. This construction will check entry of dust to the arm member interior.

Other embodiments will be described hereinafter. In the following description, like reference numerals am used to identify like parts in the first embodiment.

Second Embodiment

In the first embodiment, only the line guide portion is moved back and forth. Since the line guide portion is disposed in a position relatively distant from the rotational axis of the rotor, the movement of the line guide portion could cause a dynamic imbalance of the rotor. Further, with only the line guide portion G and its support movable back and forth, the center of gravity of the line guide portion also moves back and forth in time of line winding. Thus, the balance will change momentarily with progress of line winding, whereby the rotor could vibrate in a complicated way to impair operability. To secure an improved dynamic balance of the rotor, this embodiment employs both a fixed balancing device and a movable balancing device.

Figure 15:
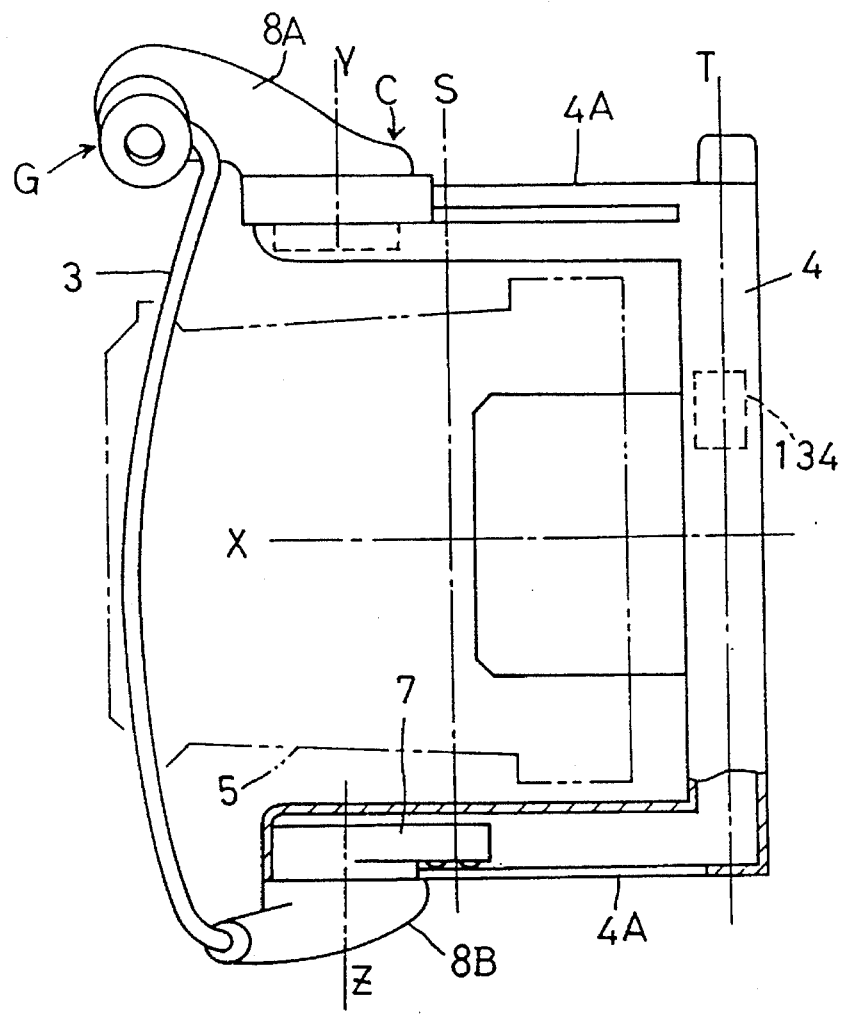
FIG. 15 is a side view, partly in section, of a rotor in the second embodiment.
Figure 16:
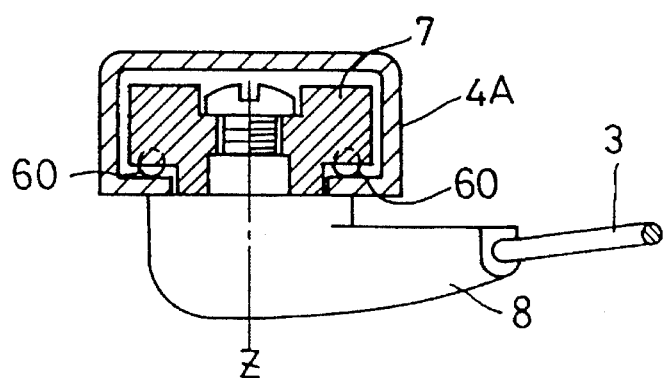
FIG. 16 is a sectional view of the driven member in the second embodiment.
Figure 17:
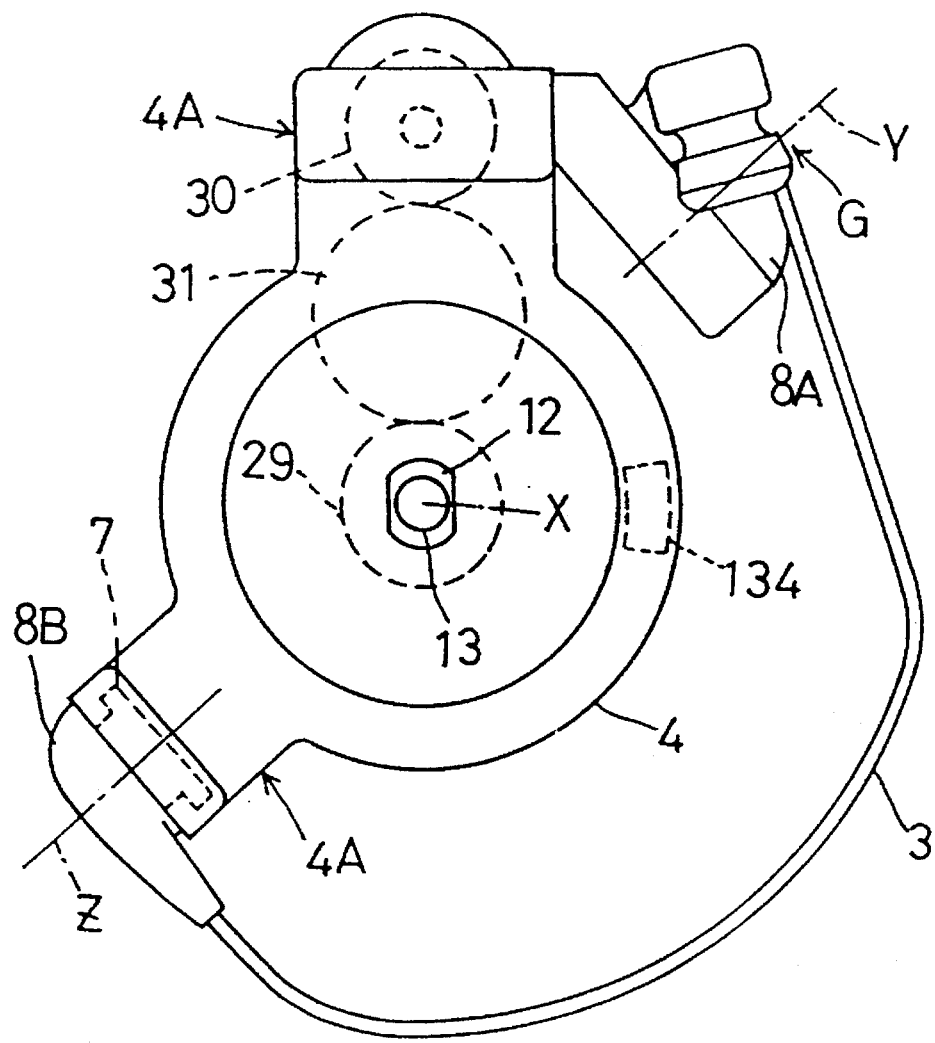
FIG. 17 is a front view of the rotor in the second embodiment.

As shown in FIGS. 15 and 16, a weight such as of metal is provided peripherally of the rotor 4 to act as a balancer 134 to balance rotation of the rotor 4, excluding the line guide portion G and the components reciprocable with the line guide portion G (hereinafter called the reciprocating system). Thus, this balancing structure suppresses a moment generated with rotation of the rotor 4. Further, the movable balancing device is provided to counteract a weight displacement along the axis X of the spool 5 occurring with reciprocation of the line guide portion G, to suppress a moment generated with rotation of the rotor 4.

Figure 18:
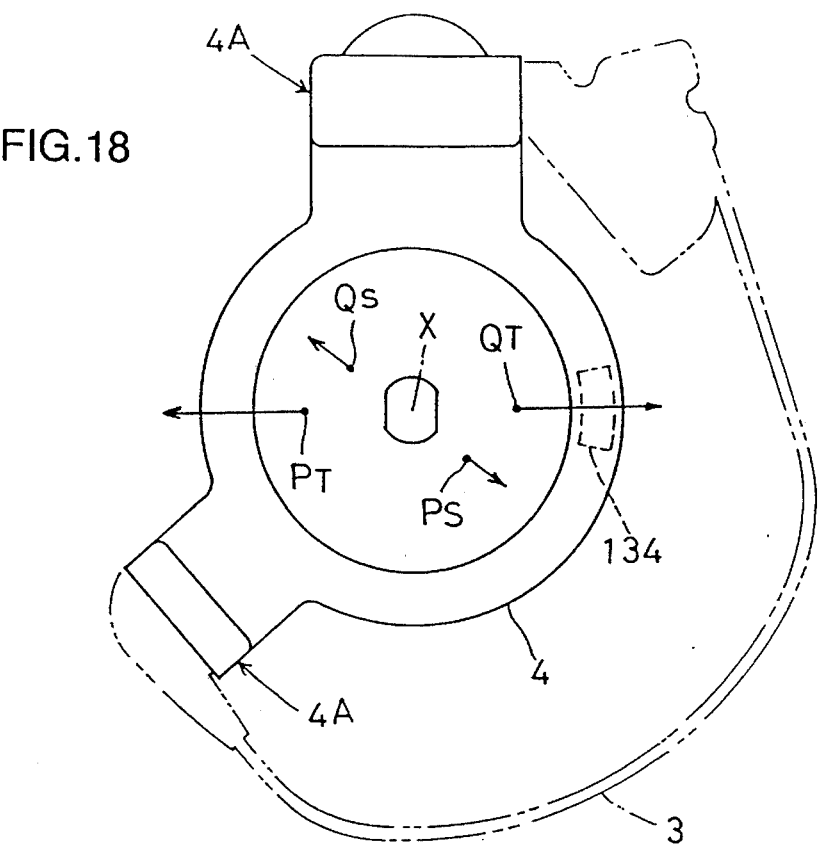
FIG. 18 is a front view of the rotor in the second embodiment with reciprocating elements excluded, showing a state of moment application.

The balancing structure of the rotor 4, excluding the movable elements, will be described first using the concept of moment with reference to FIG. 18. A combined moment of rotor components excluding the pair of arms 4A acts at a point PS on an imaginary plane S. To counteract this combined moment, the pair of arms 4A are arranged to produce a moment at a point QS opposed to point PS across the axis X. The weight of the arms 4A is selected accordingly. A combined moment of rotor components including the pair of arms 4A acts at a point PT on an imaginary plane T. To counteract this combined moment, the balancer 34 is arranged to produce a moment at a point QT opposed to point PT across the axis X. In this way, rotation of the rotor 4 is balanced.

Figure 19:
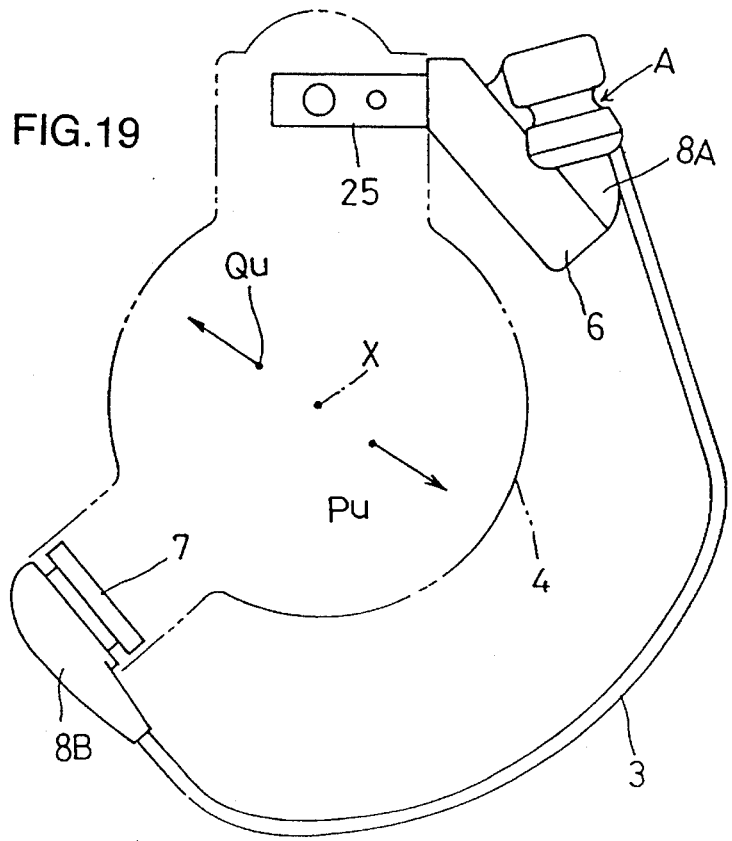
FIG. 19 is a front view of the reciprocating element in the second embodiment, showing a state of moment application.

Next, balancing of rotation of the rotor 4 relating to the line guide portion G, bail 3, driven member 7 and so on will be described with reference to FIG. 19. A moment of the bail 3 acts at a point PU. To counteract this moment, the driven member 7, support arm 8B adjacent the driven member 7, line guide portion G, arm member 8A adjacent the line guide portion G, and movable member 25 are arranged to produce a moment at a point QU opposed to point PU across the axis X. In this way, rotation of the rotor 4 is balanced with respect to the reciprocating system.

Figure 14:
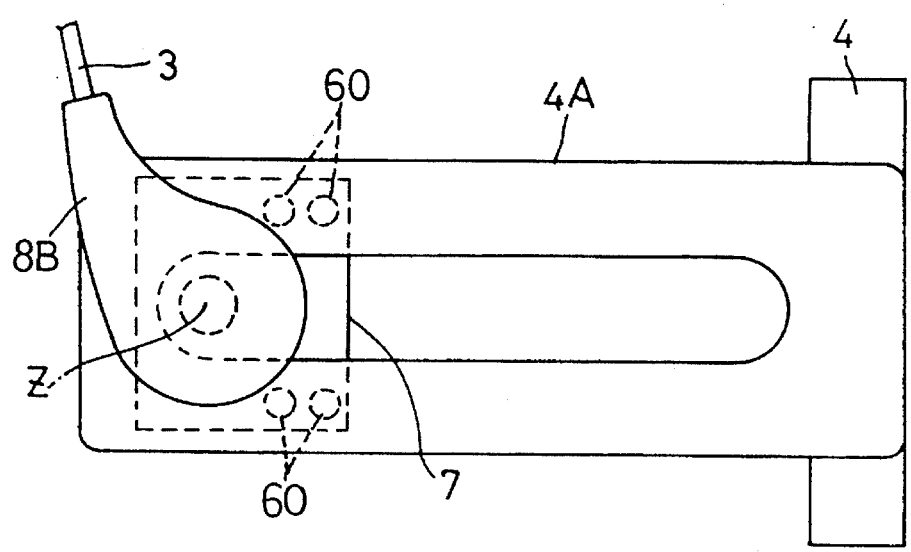
FIG. 14 is a bottom view of a driven member in the second embodiment.

To realize the above balancing feature in this embodiment, as shown in FIGS. 14 through 16, the driven member 7 and the support arm 8B connected to the driven member 7 are formed as weights by die-casting zinc to act as the movable balancing device reciprocable substantially with the line guide portion G.

The driven member 7 has a plurality of balls 60 contacting an inner surface of the arm 4A to be movable smoothly. Thus, the driven member 7 is movable in unison with the line guide portion G.

Figure 12:
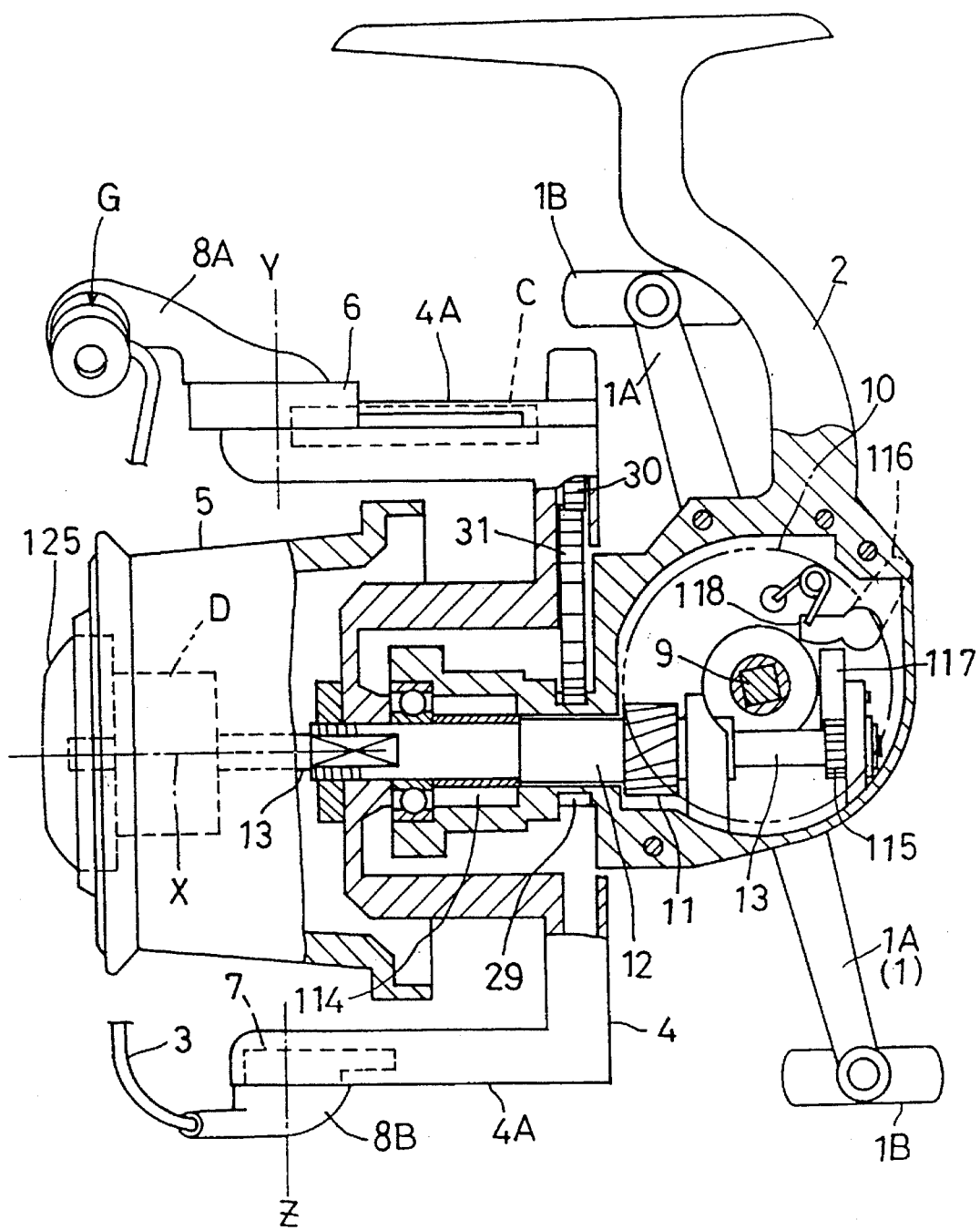
FIG. 12 is a side view, partly in section, of the spinning reel in the second embodiment.
Figure 13:
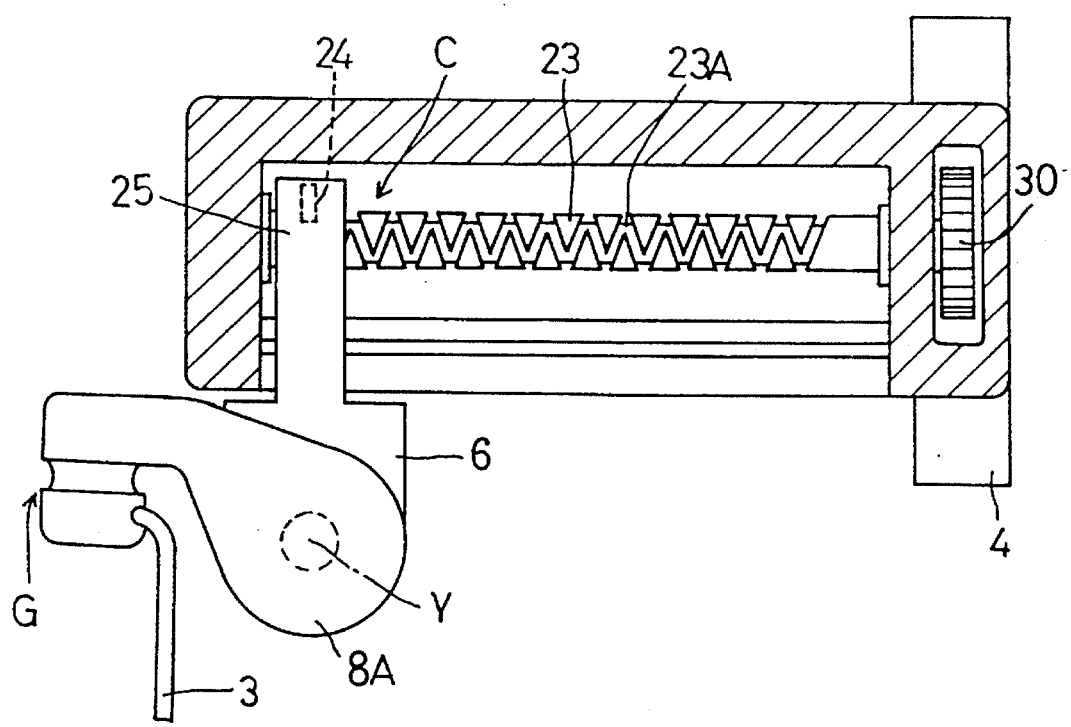
FIG. 13 is a plan view, partly in section, of a reciprocating mechanism in the second embodiment.

As shown in FIG. 12, the spinning reel shown here as the second embodiment has a roller type one-way clutch 114 between the sleeve shaft 12 and the reel body 2 for stopping rotation of the rotor 4 in a line releasing direction.

Furthermore, in the reel of the second embodiment, the spool shaft 13 is rotatably but axially immovably supported on the reel body 2, and a rotation restricting mechanism for the spool shaft 13 is mounted in a rear end region of the reel body 2. The rotation restricting mechanism for spool shaft 13 comprises a ratchet wheel 115 provided on a rear end of the spool shaft 13 integrally formed thereon, a stop pawl 117 supported on the reel body 2 shiftable between an engaged position engaged with a tooth of said ratchet wheel 115 and a disengaged position disengaged therefrom, a switch lever 116 to operate said stop pawl 117 to change their positions. When the stop pawl 117 is operated to the disengaged position via a cam member 118 connected to the switch lever 116, the spool 5 will be allowed to rotate in either direction, which makes it possible to completely freely control the unwound amount of the fishing line from the spool 5. On the contrary, when the stop pawl 117 is operated to the engaged position, the rotation of the spool 5 in a line releasing direction will be stopped, but the rotation of the spool 5 in a line winding direction will be allowed under a force overcoming the urging force of a spring operated on the stop pawl 117, thus making it possible to rotate the spool 5 in a direction to recover the unwound fishing line on the spool 5.

With the spinning reel having the above construction, when the handle 1 is operated after setting the bail 3 to the line winding position, the reciprocating mechanism C, in response to rotation of the rotor 4, drives the pivot arm 8 and line guide portion G back and forth to cause the fishing line to be wound in appropriate positions on the spool. Even if the rotor 4 is rotated at high speed in time of line winding, the rotor 4 and the reciprocating system including the bail 3 are balanced independently of each other. Consequently, the fishing line is wound smoothly free of vibrations though the heavy components such as the line guide portion G move back and forth.

For a smooth line winding operation with this type of reel, the rotational imbalance of rotor 4 should desirably be 200 g-mm or less. In this embodiment, therefore, the rotational imbalance of rotor 4 is set to 200 g-mm or less.

Third Embodiment

Figure 20:
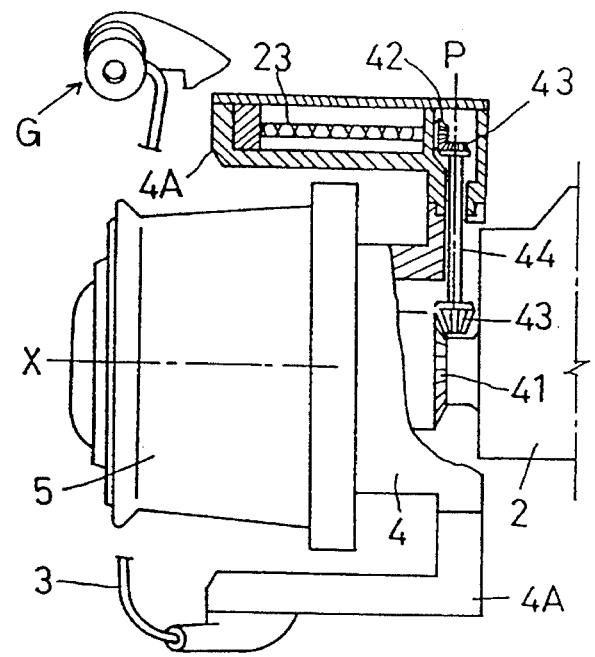
FIG. 20 is a side view, partly in section, of a spinning reel in a third embodiment of the invention.

As shown in FIG. 20, a transmission mechanism for moving the line guide portion G back and forth with rotation of the rotor 4 includes a helical type main gear 41 formed in a forward position of the reel body 2 coaxially with the axis X of the spool, a helical type driven gear 42 provided at an end of the screw shaft 23, a pair of helical gears 43 meshed with the two helical type gears, respectively, and a transmission shaft 44 interconnecting the pair of gears 43.

With this transmission mechanism, the arms 4A are connected to be pivotable relative to the rotor 4 about an axis coinciding with an axis P of the transmission shaft 44, to switch the bail between the line winding position and line releasing position.

Figure 21:
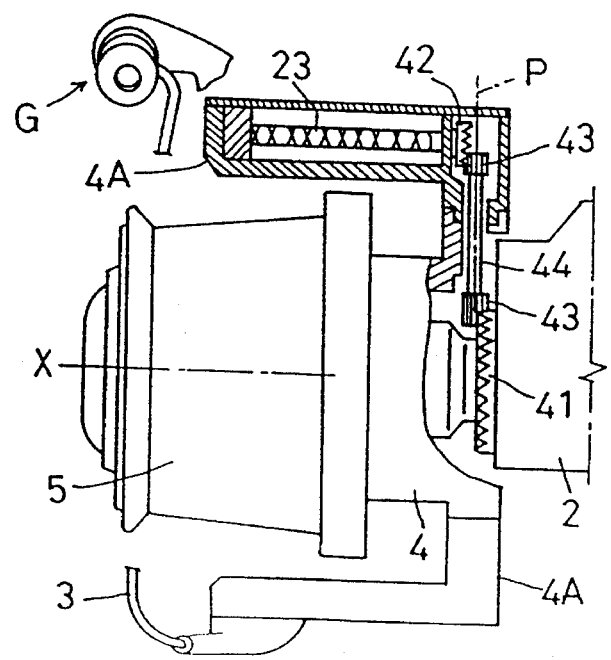
FIG. 21 is a side view, partly in section, of a modified spinning reel in the third embodiment.

As shown in FIG. 21, the helical type gear interlocking may be replaced by face type gears 41 and 42 and a pair of pinion gears 43 meshed therewith, respectively.

Fourth Embodiment

Figure 22:
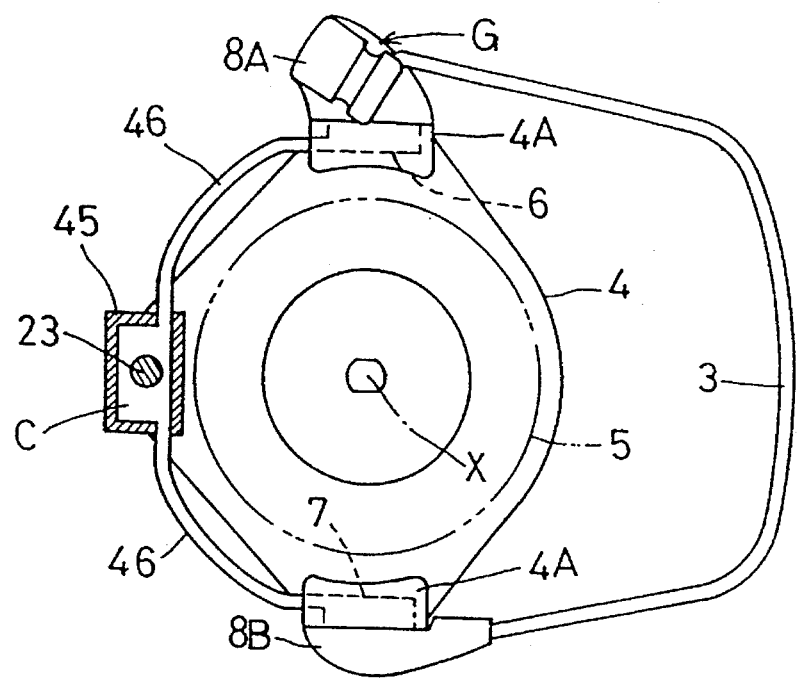
FIG. 22 is a front view of a rotor of a spinning reel in a fourth embodiment of the invention.
Figure 23:
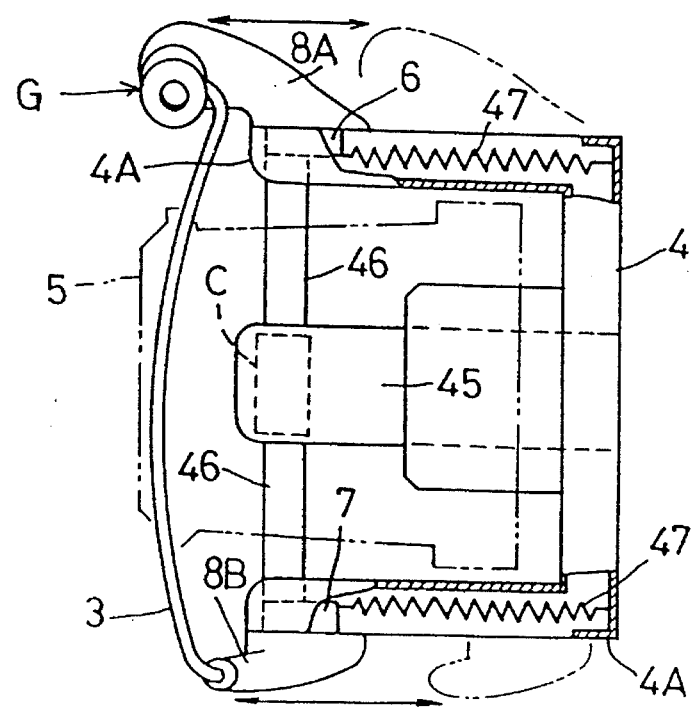
FIG. 23 is a side view, partly in section, of the rotor in the fourth embodiment.

As shown in FIGS. 22 and 23, a pair of arms 4A are arranged opposite each other across the axis X of the spool. A drive arm 45 containing the reciprocating mechanism C is disposed in a peripheral position of the rotor 4 spaced from the two arms 4A and opposed to the bail 3. A frame 46 extends from the drive arm 45 to the arm member 8A and support arm 8B. A reciprocating force taken out of the drive arm 45 is transmitted evenly to the arm member 8A and support arm 8B through the frame 46, to drive the arm member 8A and support arm 8B back and forth. In this embodiment, the arms 4A contain springs 47 for biasing the arm member 8A and support arm 8B rearward toward the reel body 2, respectively. This assures uniform application of the reciprocating force to the arm cam 8A and support arm 8B.

Moreover, to realize an improved balance of rotation of the rotor 4, in this embodiment, the weight of the drive arm 45 is selected so that the drive arm 45 counteracts at least part of the weight of the bail 3 unevenly distributed radially of the rotational axis of the rotor.

Fifth Embodiment

Figure 24:
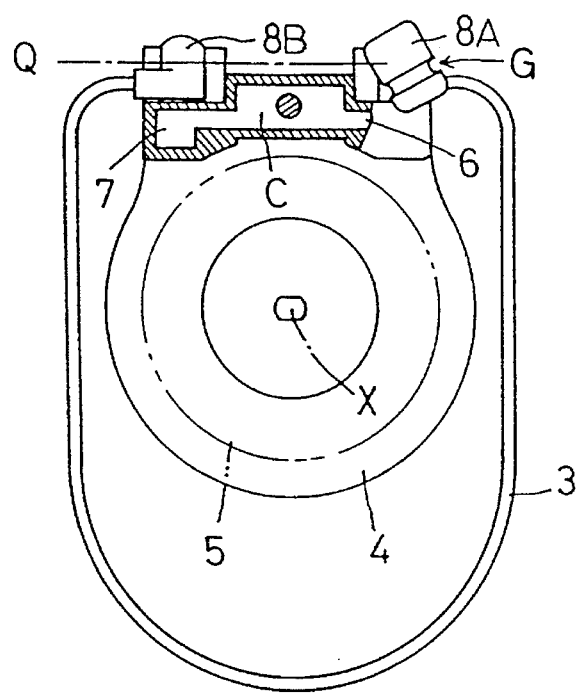
FIG. 24 is a front view of a rotor of a spinning reel in a fifth embodiment of the invention.
Figure 25:
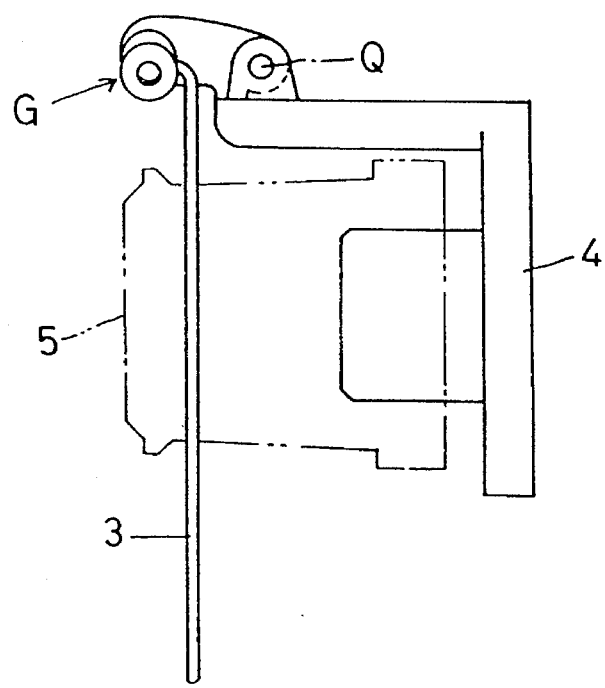
FIG. 25 is a side view of the rotor in the fifth embodiment.

As shown in FIGS. 24 and 25, the reciprocating mechanism C is disposed peripherally of the rotor 4, with the slide member 6 and driven member 7 opposed to each other across the reciprocating mechanism C. Thus, the line guide portion G on the arm member 8A and the support arm 8B are arranged relatively close to each other. Further, the arm member 8A and support arm 8B are pivotable about a single axis Q extending perpendicular to the axis X of the spool. Consequently, the bail 3 extending between the arm member 8A and support arm 8B is selectively set to the line winding position and line releasing position.

In this construction, the arm member 8A and support arm 8B are driven by the reciprocating mechanism C disposed very close thereto. The line guide portion G is therefore operable very smoothly with little chance of being subjected to twisting forces.

Sixth Embodiment

Figure 26:
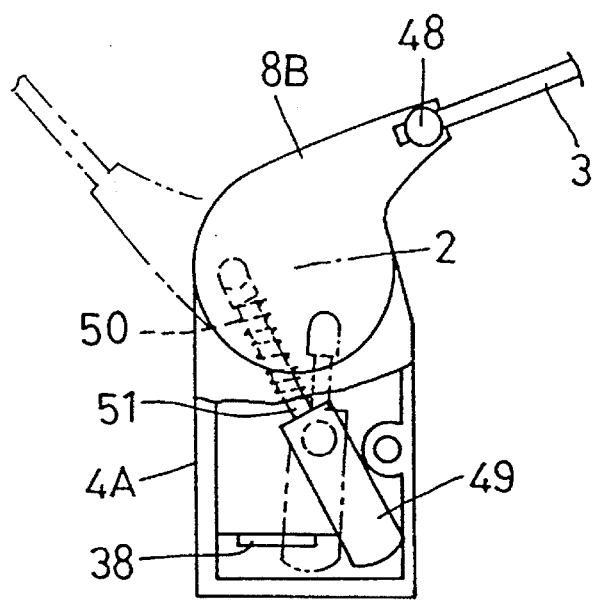
FIG. 26 is a bottom view, partly in section, of a support arm of a spinning reel in a sixth embodiment of the invention.
Figure 27:
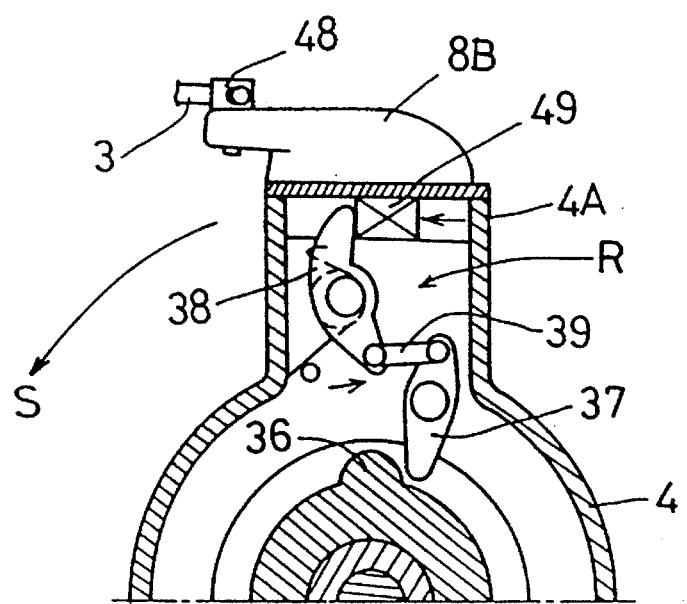
FIG. 27 is a rear view in vertical section of a bail return mechanism in the sixth embodiment.

The support arm 8B opposed to the line guide portion G is supported by the arm 4A of the rotor 4 to be pivotable about axis Z but not to be reciprocable. As shown in FIGS. 26 and 27, the support arm 8B pivotably supports the bail 3 through an axis 48. Pivotal movement of the bail 3 about the axis 48 allows movement of the bail 3 occurring at the end connected to the support arm 8B and corresponding to the fore and aft movement of the line guide portion G. The arm 4A at this side includes a bail return mechanism R for restoring the bail 3 in the line winding position when the rotor 4 is rotated in the line winding direction with the bail 3 set to the line releasing position.

A toggle mechanism for selectively setting the support arm 8B to the line winding position and line releasing position includes a pin 51 biased by a spring 50 to project from a pivotable case 49. The bail return mechanism R includes a cam member 36 formed on the reel body 2, a first swing piece 37 for contacting the cam member 36, a second swing piece 38 for pivoting the case 49, and a link 39 interconnecting the first swing piece 37 and second swing piece 38. In this embodiment, the bail 3 is reinstated in the line winding position with rotation of the rotor 4 in the direction S in FIG. 27.

Figure 31:
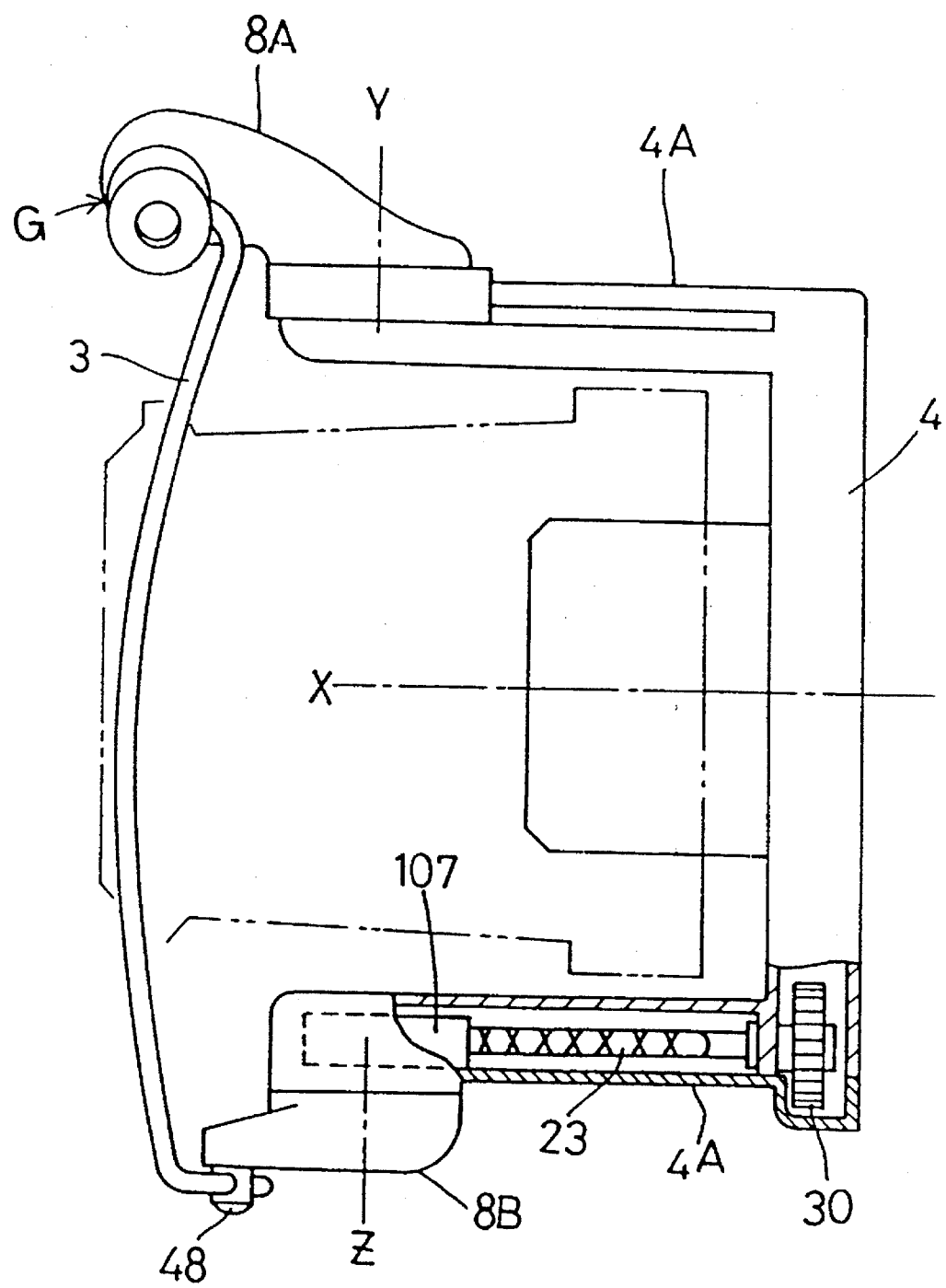
FIG. 31 is a side view, partly in section, of a rotor in the sixth embodiment, showing a movable balancing device.

Further, as shown in FIG. 31, the arm 4A supporting the support arm 8B contains a movable member 107 reciprocable along the axis X of spool 4 with rotation of the screw shaft 23. The movable member 107 is formed of a heavy material such as metal to serve as a weight also. This movable member 107 acts as a movable balancing device for counteracting weight movement of the reciprocating system to provide an improved rotational balance of the rotor 4. The screw shaft 23 may be driven by a planetary gear transmission system as shown in the first embodiment, or a shaft transmission system as shown in the third embodiment.

Figure 28:
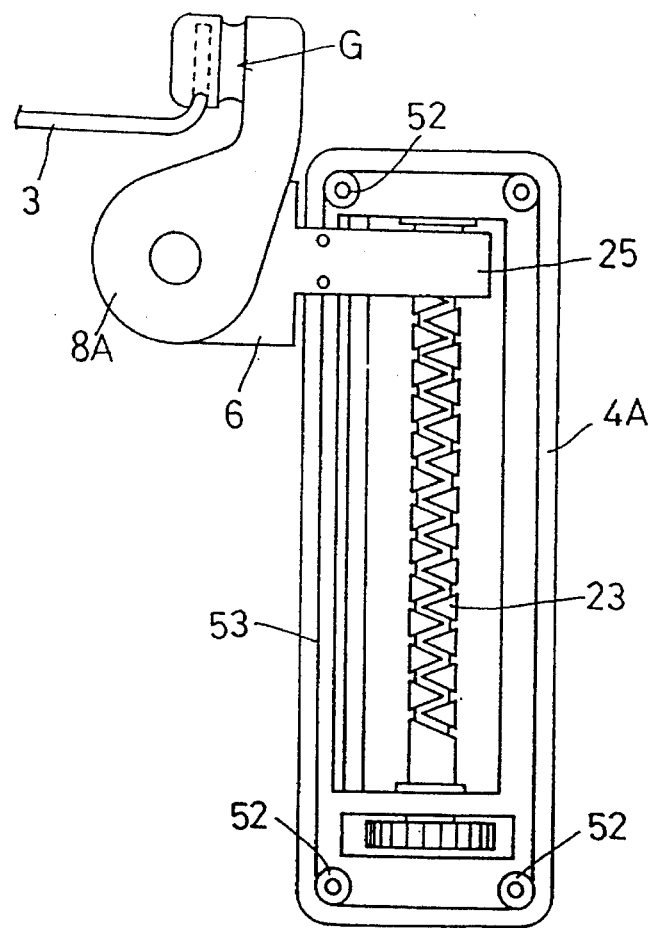
FIG. 28 is a plan view of an arm in the sixth embodiment.

As shown in FIGS. 28, the interior of the arm 4A is protected from dust by a shield member 53 formed of soft rubber or the like and guided by a plurality of idle rollers 52 in a way to allow reciprocation of the movable members.

Figure 29:
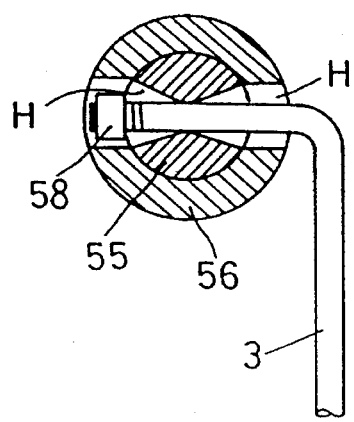
FIG. 29 is a sectional view of a bail support structure in the sixth embodiment.
Figure 30:
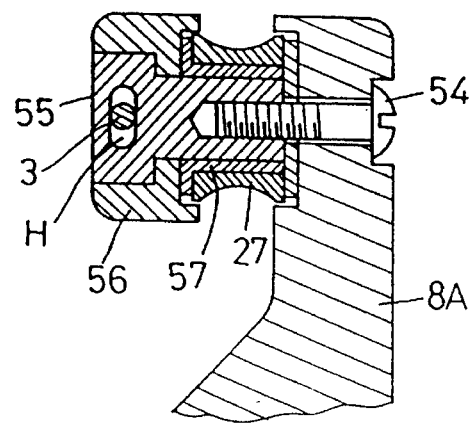
FIG. 30 is a sectional view of a line guide portion and the bail support structure in the sixth embodiment.

As shown in FIGS. 29 and 30, the line guide portion G includes a nut 55 meshed with a screw 54 extending through the arm member 8A, a case 56 in contact with the nut 55, a bush 57 and a roller 27. An end of the bail 3 extends through slots H defined in the case 56 and nut 55, with a retainer 58 meshed with the projecting end of the bail 3. This construction eliminates twisting of the bail 3.

Seventh Embodiment

Figure 32:
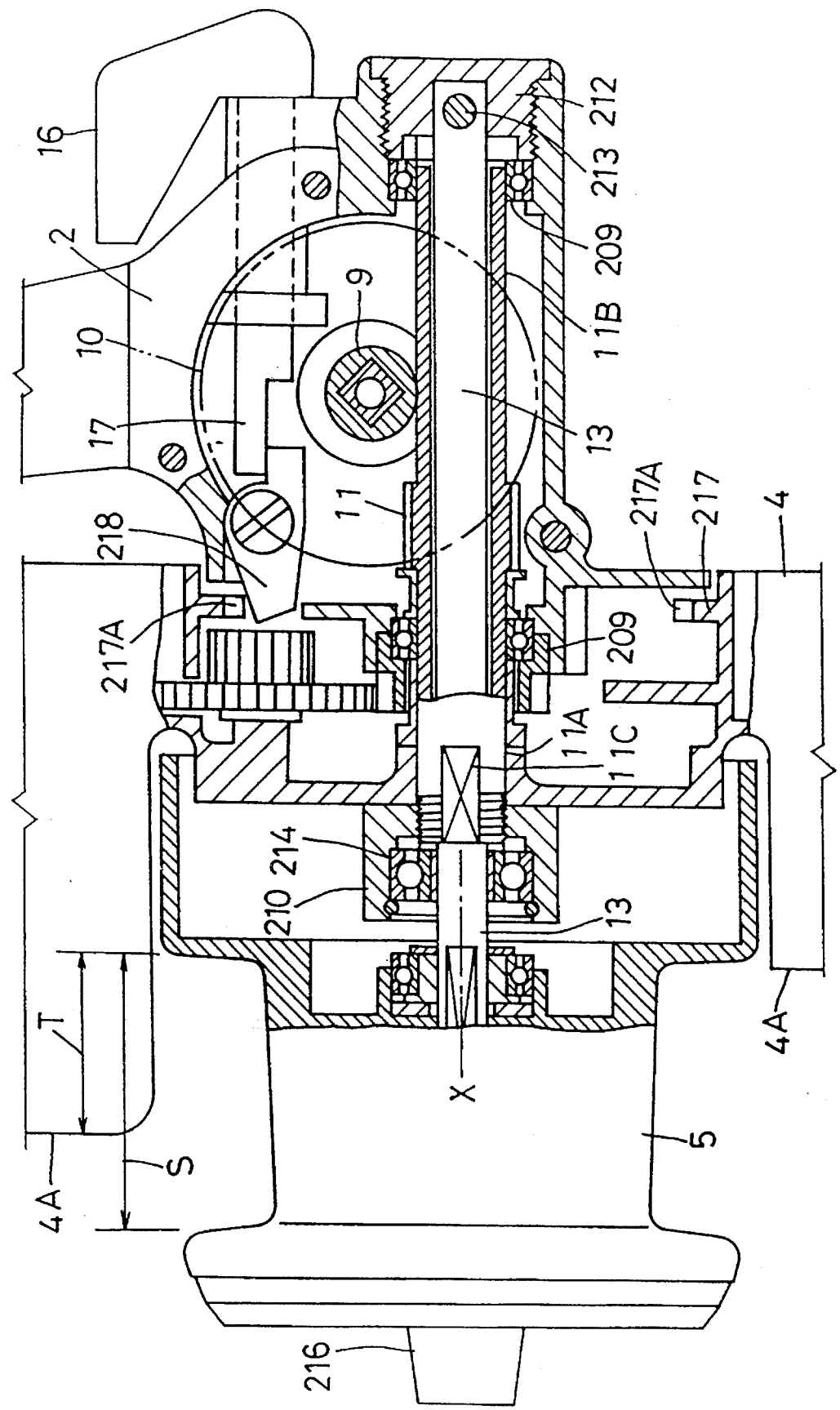
FIG. 32 is a side view, partly in section, of a pinion support structure of a spinning reel in a seventh embodiment of the invention.

FIG. 32 shows a spinning reel similar to the first embodiment and having a reciprocating mechanism mounted in an arn 4A. However, this spinning reel is the so-called front drag type having a drag mechanism disposed forwardly of the spool. In this reel, a pinion gear 11 is formed tubular, and has shafts 11A and 11B formed integral therewith and extending forwardly and rearwardly therefrom, respectively. The shafts 11A and 11B are supported by the reel body 2 through rolling bearings 209, respectively, to be rotatable about an axis X extending in the fore and aft direction of the reel body 2. The rolling bearings 209 are opposed to each other in the fore and aft direction across a position of engagement between the pinion gear 11 and drive gear 10 as seen in a direction along the axis of drive gear 10. The rolling bearings 209 are spaced from the position of engagement by at least 10 mm. Consequently, when the rotor 4 is rotated for line winding, the two bearings 209 allow the pinion gear 11 to rotate smoothly without deflection for a smooth line winding operation. A strong load would act in a bending direction on the pinion gear 11 in time of hooking. However, this load is borne by the two rolling beatings 209 to maintain the pinion gear 11 in axial alignment. The pinion gear 11 may be supported by more than two. e.g. three, rolling bearings.

The shaft 11A extending forwardly from the pinion gear 11 has a pair of fitting surfaces 11C formed peripherally thereof. The rotor 4 is fixed to a forward end of the shaft 11A to be rotatable together, with the fitting surfaces 11C inserted into fitting recesses of the rotor 4, and with a nut 210 screwed tight to the shaft 11A. The spool 5 is connected to a spool shaft 13 extending through the pinion gear 11 to be coaxial with the axis X.

The spool shaft 13 extends coaxially through the pinion gear 11, with a circumferential space formed between the spool shaft 13 and an inner surface of the pinion gear 11. Thus, the pinion gear 11 is rotatable without contacting the spool shaft 13, wherefore the spool shaft 13 does not impart a resistance to rotation of the pinion gear 11. The spool shaft 13 is supported at a rear end thereof in the reel body 2, not to be rotatable relative thereto, through a support member 212 and a pin 213 disposed at a rear end of the reel body 2. (The spool shaft 13 and support member 212 may be formed integral with each other.) An intermediate position of the spool shaft 13 is relatively rotatably supported by the rotor 4 through a rolling bearing 214 mounted in the nut 210, which secures the spaced relationship of the spool shaft 13 to the inner surface of the pinion gear 11. A forward end of the spool shaft 13 is connected to the spool 5 through the drag mechanism (not shown).

Figure 35:
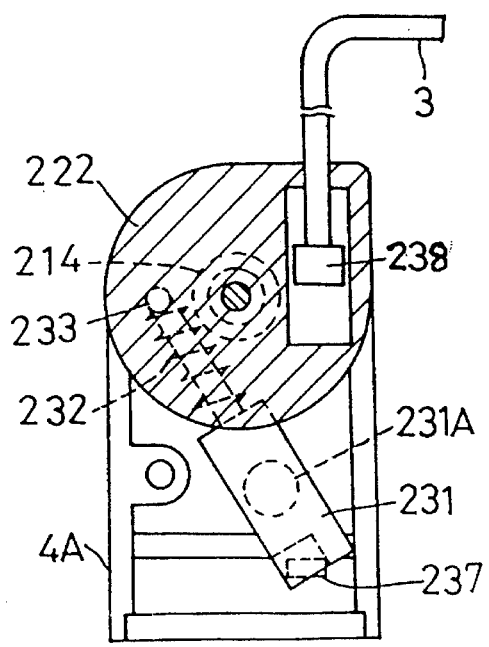
FIGS. 35 and 36 are bottom views, partly in section, of a support arm with a bail in a line winding position in the seventh embodiment.
Figure 36:
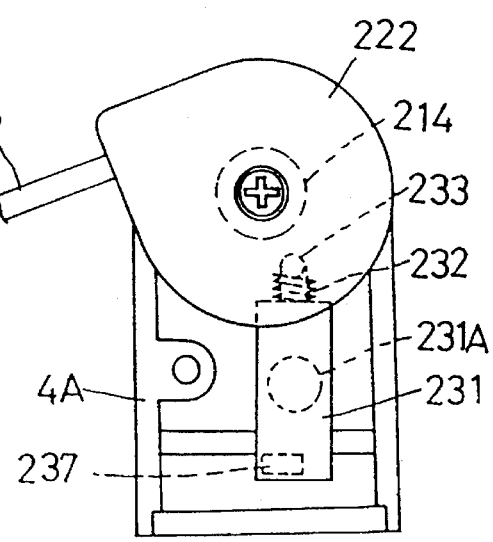

As shown in FIGS. 35 and 36, a support arm 222 is rotatably supported by an arm 4A through a rolling beating 14. The support arm 222 is switchable between the line winding position and line releasing position by a toggle mechanism including a pin 233 biased by a spring 232 to project from a case 231 supported by the arm 4A to be pivotable about an axis 231A.

Figure 34:
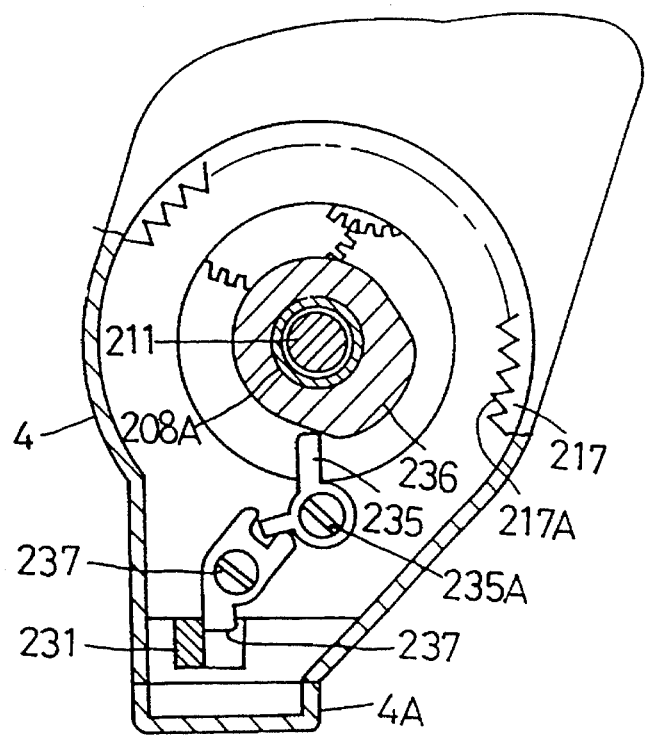
FIG. 34 is a rear view, partly in section, of a return mechanism in the seventh embodiment.

As shown in FIG. 34, the arm 4A at this side supporting the support arm 222 has a bail return mechanism mounted therein. The return mechanism includes a control arm 237 supported by a rear surface of the rotor 4 to be pivotable about an axis 37A, and a contact member 235 supported by the rear surface of the rotor 4 to be pivotable about an axis 235A. The return mechanism restores the bail 3 in the line winding position when the rotor 4 is rotated in the line winding direction with the bail 3 set to the line releasing position. Specifically, as shown in FIG. 36, the contact member 235 pivots through contact with a cam 236 formed in a forward position of the reel body 2 when the rotor 4 is rotated. The pivoting force is transmitted through the control arm 237 to the case 231 of the toggle mechanism. Then the case 231 switches the bail 3 to the line winding position.

In this reel, the support arm 222 is supported not to reciprocate relative to the rotor 4. As shown in FIG. 35, the end of the bail 3 remote from an arm member 221 is slidably supported in the support arm 222 in order to eliminate twisting of the bail 3 when the arm member 221 operates. The bail 3 is slidable through a stroke corresponding to a stroke of the reciprocating mechanism C. A retainer 238 is attached to this end of the bail 3.

Figure 33:
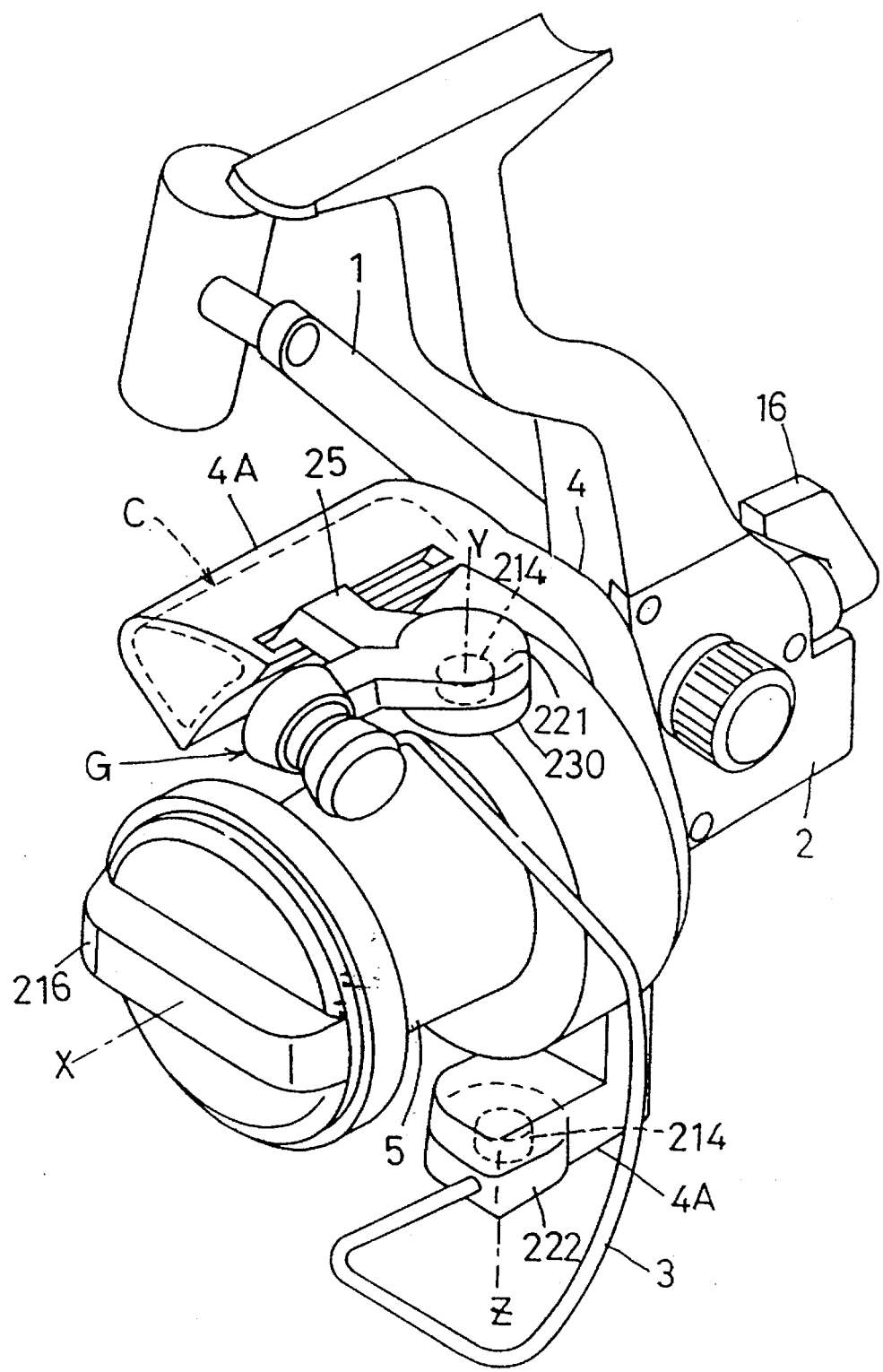
FIG. 33 is a perspective view of the spinning reel in the seventh embodiment.

In use of this reel, a bait is cast with the bail 3 set to the line releasing position, whereby the fishing line is unwound from the spool 5 as in a conventional spinning reel. As shown in FIGS. 32 and 33, the arm 4A supporting the support arm 222 has a smaller fore and aft length than the arm 4A supporting the arm member 221 (that is, a forward end of the former is disposed rearwardly of that of the latter). This construction substantially reduces a resistance applied to the fishing line through contact with the arms 4A when the fishing line is unwound. Consequently, the bait may be cast an increased distance. That is, as shown in FIG. 32, the arm 4A supporting the arm member 221 projects an amount T overlapping a line winding width S of the spool 5 in the fore and aft direction (amount T being about two thirds of line winding width S). The arm 4A supporting the support arm 222 overlaps at most half the line winding width S of the spool 5.

What is claimed is:

1. A spinning reel comprising:
   a reel body;
   a handle;
   a spool supported in a forward position of said reel body; and
   a rotor rotatable about an axis by drive transmitted from said handle to wind a fishing line on said spool, said rotor including:
   a first arm and a second arm extending forwardly from peripheries of said rotor;
   a line guide portion mounted on said first arm to be movable substantially in fore and aft directions of said reel body;
   a bail extending from a vicinity of said line guide portion;
   a reciprocating mechanism for moving said line guide portion, said reciprocating mechanism being disposed radially outwardly of said spool and extending in said fore and aft direction, said reciprocating mechanism being mounted on one of said first arm and said second arm; and
   an intermediate transmission device extending radially of said axis to transmit the drive from said handle to said reciprocating mechanism, said intermediate transmission device including a sun gear fixedly provided on said reel body, and a planet gear for interlocking said sun gear and said reciprocating mechanism.

2. A spinning reel as defined in claim 1, wherein one end of said bail is supported on said line guide portion.

3. A spinning reel as defined in claim 1, where said reciprocating mechanism includes a screw shaft having a rotational axis extending in said fore and aft direction, and a movable member engaged with a helical groove defined in said screw shaft to convert rotation of said screw shaft into a reciprocating motion.

4. A spinning reel as defined in claim 1, wherein said reciprocating mechanism includes a chain for interlocking a pair of gears spaced from each other in said fore and aft direction, and a movable member fixed to said chain.

5. A spinning reel as defined in claim 1, further comprising a movable balancer movable with reciprocation of said line guide portion for dynamically counteracting at least part of a weight of said line guide portion during rotation of said rotor.

6. A spinning reel as defined in claim 1, wherein said reciprocating mechanism is mounted on said first arm.

7. A spinning reel as defined in claim 6, wherein said reciprocating mechanism includes a movable member movable along said first arm, said line guide portion being pivotally supported by said movable member.

8. A spinning reel as defined in claim 7, wherein said second arm includes a support arm pivotable about an axis immovable relative to said second arm, said bail being pivotably supported by said support arm.

9. A spinning reel as defined in claim 8, where said second arm includes a movable balancer movable parallel to said second arm in response to movement of said line guide portion.

10. A spinning reel as defined in claim 8, wherein said pivotal axis of said support arm is disposed in a position on said second arm opposed to an intermediate position in a range of movement of said line guide portion with respect to said axis.

11. A spinning reel as defined in claim 7, wherein said bail is connected to a support arm movable along said second arm.

12. A spinning reel as defined in claim 11, wherein said support arm includes a weight movable with said support arm for dynamically counteracting at least part of a weight of said line guide portion during rotation of said rotor.

13. A spinning reel as defined in claim 6, wherein said first arm and said second arm are pivotably supported by said rotor.

14. A spinning reel as defined in claim 1, wherein said reciprocating mechanism is mounted on said second arm, said rotor further including a coupler for interconnecting said reciprocating mechanism and said line guide portion.

15. A spinning reel as defined in claim 1, further comprising a counterweight fixed to said rotor for dynamically balancing said rotor excluding a weight of said line guide portion and a movable balancer reciprocable with said line guide portion.

16. A spinning reel as defined in claim 1, further comprising a drive gear rotatable by the drive from said handle, a pinion gear meshed with said drive gear and rotatable with said rotor, a first rolling bearing for supporting said pinion gear in a position forwardly of a position of meshing between said pinion gear and said drive gear, and a second rolling bearing for supporting said pinion gear in a position rearwardly of said position of meshing.

17. A spinning reel as defined in claim 16, wherein said pinion gear coaxially surrounds said spool shaft with a circumferential space therebetween.

18. A spinning reel comprising:

a reel body;

a handle;

a spool supported in a forward position of said reel body; and a rotor rotatable about an axis by drive transmitted from said handle to wind a fishing line on said spool, said rotor including:

a first arm and a second arm extending forwardly from peripheries of said rotor;

a line guide portion mounted on said first arm to be movable substantially in fore and aft directions of said reel body;

a bail extending from a vicinity of said line guide portion;

a reciprocating mechanism for moving said line guide portion, said reciprocating mechanism being disposed between said first arm and said second arm and including a movable balancer for dynamically counteracting at least part of a weight of said line guide portion during rotation of said rotor, said rotor further including a coupler for interconnecting said reciprocating mechanism and said line guide portion; and an intermediate transmission device extending radially of said axis to transmit the drive from said handle to said reciprocating mechanism.

19. A spinning reel as defined in claim 18, wherein said coupler is said bail.

20. A spinning reel as defined in claim 18, wherein said line guide portion is pivotably supported by a driven member reciprocable along said first arm.

21. A spinning reel comprising:

a reel body;

a handle;

a spool disposed forwardly of said reel body; and a rotor rotatable about an axis by drive transmitted from said handle to wind a fishing line on said spool, said rotor including:

a first arm and a second arm extending forwardly from peripheries of said rotor through regions radially outwardly of said spool;

a reciprocating mechanism mounted on said first arm and including a screw shaft rotatable about an axis extending substantially in a fore and aft direction of said reel body, a movable member mounted on said screw shaft to be reciprocable with rotation of said screw shaft, and an arm member pivotally supported by said movable member;

a support arm at least pivotally mounted on said second arm, said support arm being supported by said second arm to be reciprocable substantially in said fore and aft direction with movement of said arm member, said support arm including said movable member and a movable weight for counteracting at least part of a weight of said arm member;

a bail extending between said first arm and said second arm to be switchable with said arm member and said support arm between a line winding position and a line releasing position; and an intermediate transmission device extending radially of said axis to transmit the drive from said handle to said reciprocating mechanism, said intermediate transmission device including a sun gear fixedly provided on said reel body, and a planet gear for interlocking said sun gear and said reciprocating mechanism.

22. A spinning reel comprising:

a reel body;

a handle;

a spool supported in a forward position of said reel body; and a rotor rotatable about an axis by drive transmitted from said handle to wind a fishing line on said spool, said rotor including:

a rotor shaft rotatable with said rotor;

a first arm and a second arm extending forwardly from peripheries of said rotor;

a line guide portion mounted on said first arm to be movable substantially in fore and aft directions of said reel body;

a bail extending from a vicinity of said line guide portion;

a reciprocating mechanism for moving said line guide portion, said reciprocating mechanism being disposed radially outwardly of said spool and extending in said fore and aft direction, said reciprocating mechanism being mounted on one of said first arm and said second arm; and an intermediate transmission device extending radially of said axis to transmit the drive from said handle to said reciprocating mechanism, said intermediate transmission device including engaging teeth continually formed peripherally of said rotor shaft and a transmission shaft extending radially of said rotor for interlocking said engaging teeth and said reciprocating mechanism.

* * * * *